(12) United States Patent   (10) Patent No.:   US 12,642,631 B2
May et al.                       (45) Date of Patent:       Jun. 2, 2026

(54) DENTAL FLOSS DISPENSER

(71) Applicant: QUIP NYC INC., Brooklyn, NY (US)

(72) Inventors: William Thomas May, South Orange, NJ (US); Simon Enever, Brooklyn, NY (US); Paul Koh, New York, NY (US); Jonathan Fratti, Brooklyn, NY (US); Grayson Hild, Brooklyn, NY (US); Matthew Malone, Brooklyn, NY (US)

(73) Assignee: QUIP NYC INC., Brooklyn, NY (US)

( * ) Notice: Subject to any disclaimer, the term of this patent is extended or adjusted under 35 U.S.C. 154(b) by 183 days.

(21) Appl. No.: 17/690,079

(22) Filed: Mar. 9, 2022

(65) Prior Publication Data

US 2022/0257354 A1      Aug. 18, 2022

Related U.S. Application Data

(63) Continuation of application No. PCT/US2020/070519, filed on Sep. 10, 2020.

(60) Provisional application No. 62/900,930, filed on Sep. 16, 2019.

(51) Int. Cl.
*A61C 15/04*          (2006.01)
(52) U.S. Cl.
CPC .................................. *A61C 15/043* (2013.01)
(58) Field of Classification Search
CPC ............... A61C 15/043; A61C 15/046; A61C 15/04–048; Y10T 70/5137
USPC .................................... 132/323–325; 206/409
See application file for complete search history.

(56) References Cited

U.S. PATENT DOCUMENTS

| | | | | |
|---|---|---|---|---|
| 1,125,933 A | * | 1/1915 | Bartholomew .... | B65D 83/0409<br>221/190 |
| 1,646,082 A | * | 10/1927 | Dailey ................. | A61C 15/043<br>132/309 |
| 2,460,591 A | * | 2/1949 | Luzar ................... | A61C 15/046<br>132/326 |
| 3,246,815 A | * | 4/1966 | Aronson .............. | A61C 15/043<br>225/80 |

(Continued)

FOREIGN PATENT DOCUMENTS

| | | | |
|---|---|---|---|
| CN | 201870357 U | * | 6/2011 |
| CN | 204427535 U | * | 7/2015 |
| GB | 2494928 A | | 3/2013 |

OTHER PUBLICATIONS

Clarivate translation of CN-201870357 (Year: 2011).*

(Continued)

*Primary Examiner* — Rachel R Steitz
*Assistant Examiner* — Jennifer P Connell
(74) *Attorney, Agent, or Firm* — ArentFox Schiff LLP

(57)          ABSTRACT

A dental floss dispenser. The dispenser includes a dispenser housing enclosing an interior portion and a dispensing portion. The dispensing portion is slidably positioned inside the interior portion of the dispenser housing. The dispensing portion has a stored position and a dispensing position. In the stored position, the dispensing portion is entirely disposed in the interior portion. In the dispensing position, the dispensing portion is partially disposed outside of the interior portion. The dispensing portion further includes a storage chamber for storing a wound string of dental floss and a floss dispensing cavity for holding at least a portion of the wound string of dental floss extracted from the storage chamber.

20 Claims, 23 Drawing Sheets

(56) References Cited

U.S. PATENT DOCUMENTS

| | | | | |
|---|---|---|---|---|
| 4,005,721 | A | * | 2/1977 | Yasumoto ............. A61C 15/048 |
| | | | | 132/325 |
| 5,365,956 | A | * | 11/1994 | Guadiana ............. A61C 15/046 |
| | | | | 132/324 |
| 5,848,600 | A | | 12/1998 | Bacino et al. |
| 5,899,214 | A | | 5/1999 | Francis |
| 6,295,997 | B1 | | 10/2001 | Dickie |
| 6,398,093 | B1 | | 6/2002 | Dolan |
| 7,198,051 | B1 | * | 4/2007 | Festa ..................... A46B 5/0095 |
| | | | | 132/309 |
| 10,548,697 | B1 | * | 2/2020 | Wartman ............. A61C 15/043 |
| 2004/0119297 | A1 | * | 6/2004 | Bella ...................... A45D 40/24 |
| | | | | 292/300 |
| 2006/0086369 | A1 | * | 4/2006 | Wilkinson ......... A46B 15/0071 |
| | | | | 132/309 |
| 2007/0209953 | A1 | * | 9/2007 | Conte .................. A61C 15/043 |
| | | | | 206/409 |
| 2015/0007844 | A1 | * | 1/2015 | Devins ................. A61C 15/048 |
| | | | | 132/200 |
| 2018/0279764 | A1 | * | 10/2018 | Hill ....................... A61C 15/043 |

OTHER PUBLICATIONS

Clarivate translation of CN-204427535 (Year: 2015).*

U.S. Patent and Trademark Office, "International Search Report and Written Opinion" issued in related International Patent Application No. PCT/US2020/70519, mailed Nov. 24, 2020 (8 pages).

PCT; International Searching Authority; International Application No. PCT/US2020/70519; Search Report and Written Opinion mailed Nov. 24, 2020; 8 pages.

PCT; International Searching Authority; International Application No. PCT/US2020/70519; International Preliminary Report of Patentability; mailed Mar. 15, 2022; 7 pages.

European Patent Office, "Extended European Search Report," issued in related European Patent Application No. 20865764.3, dated Aug. 17, 2023 (5 pages).

European Patent Office, "Supplemental. European Search Report," issued in related European Patent Application No. 20865764.3, dated Sep. 5, 2023 (1 page).

National Intellectual Property Administration of the People's Republic of China, "First Office Action," with English Translation, issued in related Chinese Patent Application No. 202080077840.1, dated Jan. 26, 2024 (22 pages).

* cited by examiner

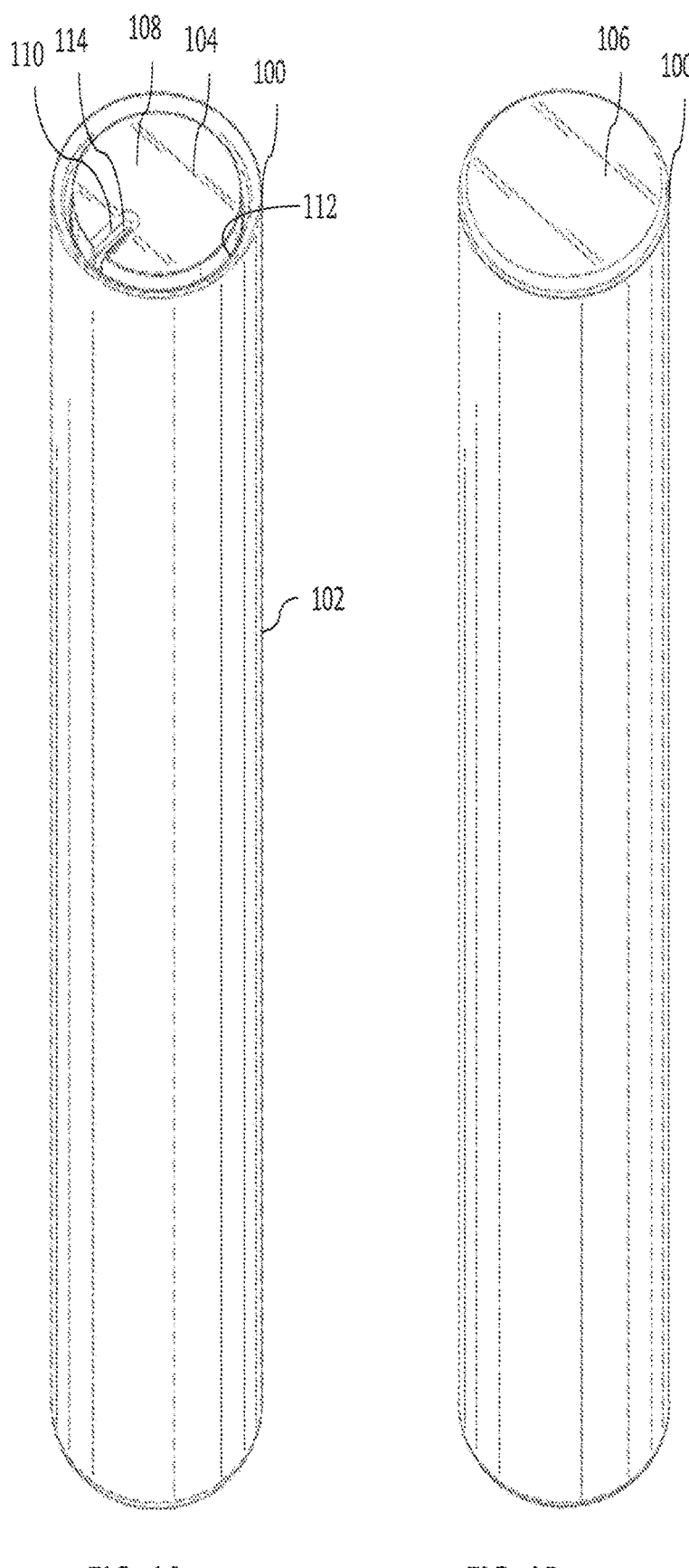
FIG. 1A.                    FIG. 1B.

106

104

108

110

FIG. 3A.
FIG. 3B.
FIG. 3C.
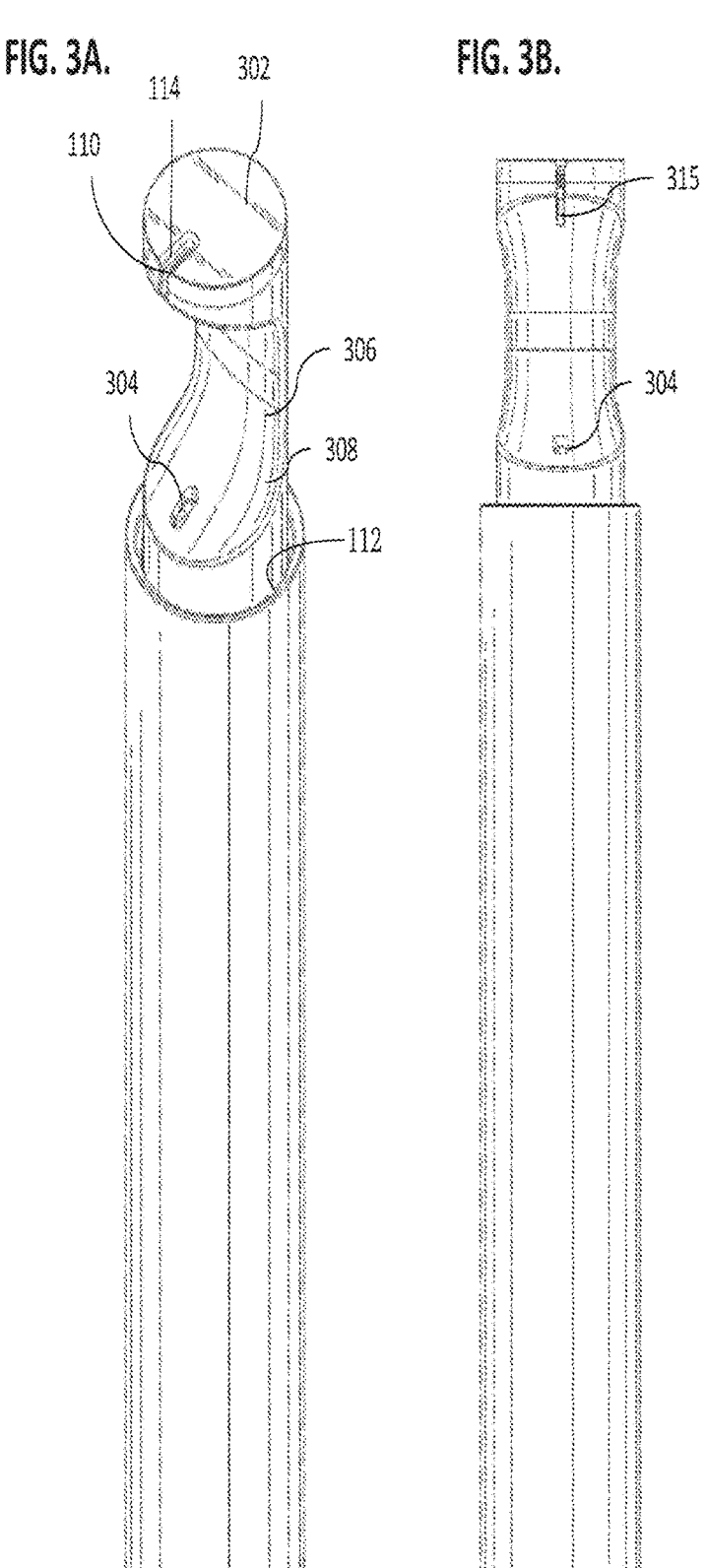
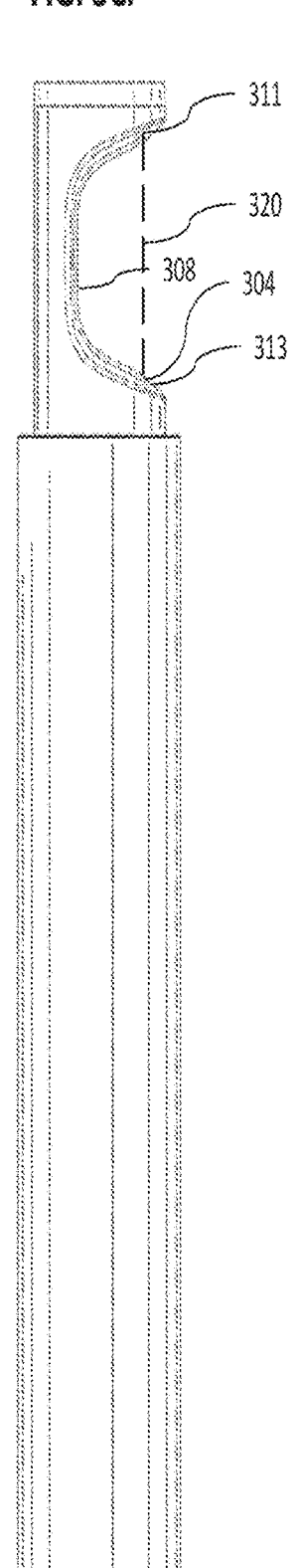

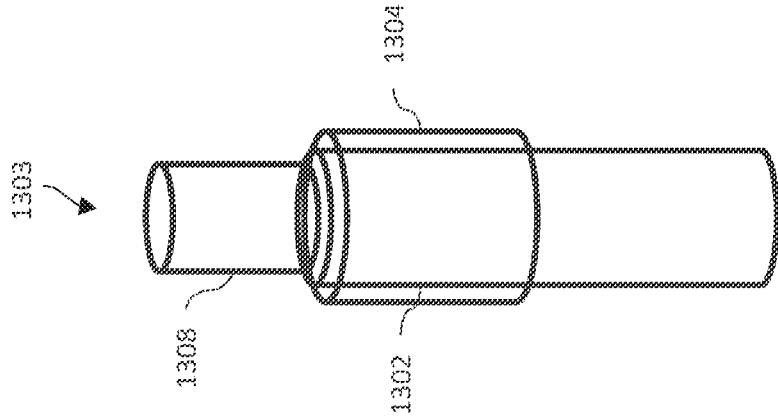
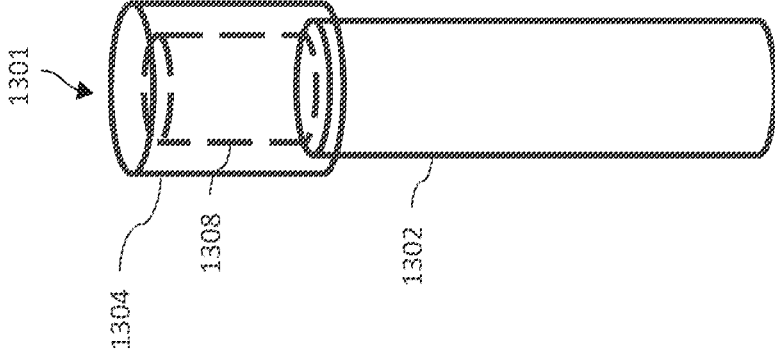
FIG. 13

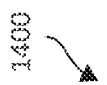
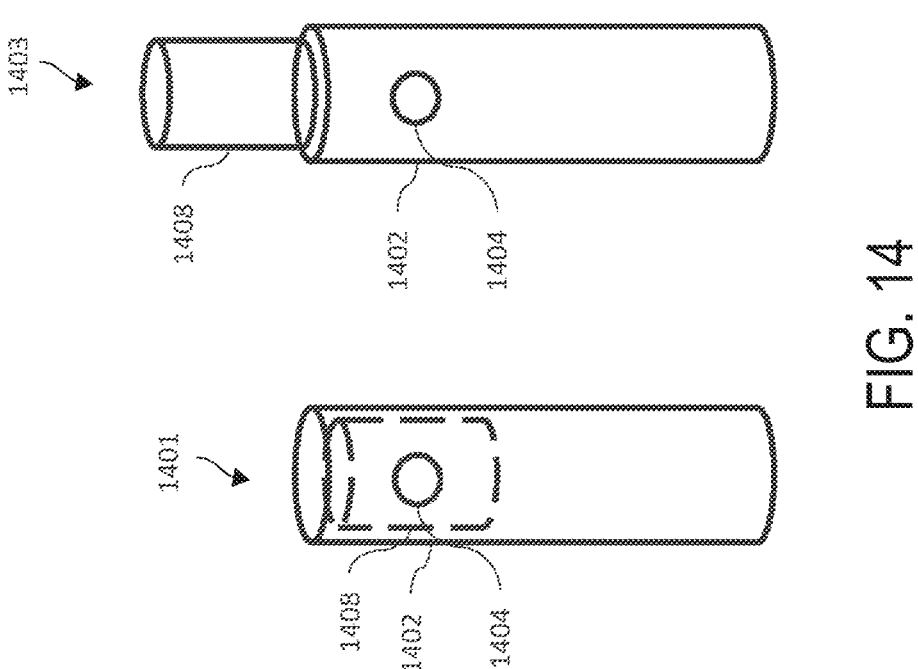
FIG. 14

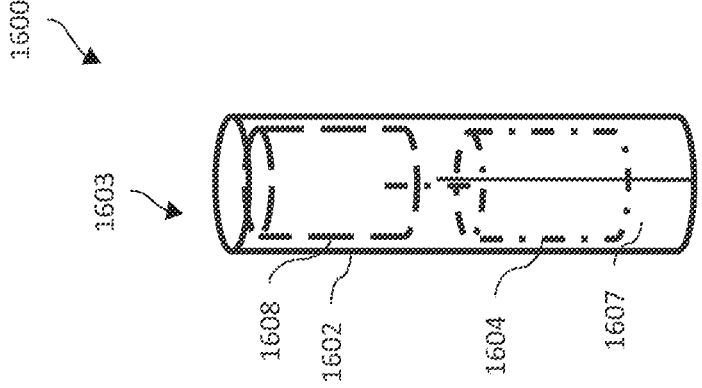
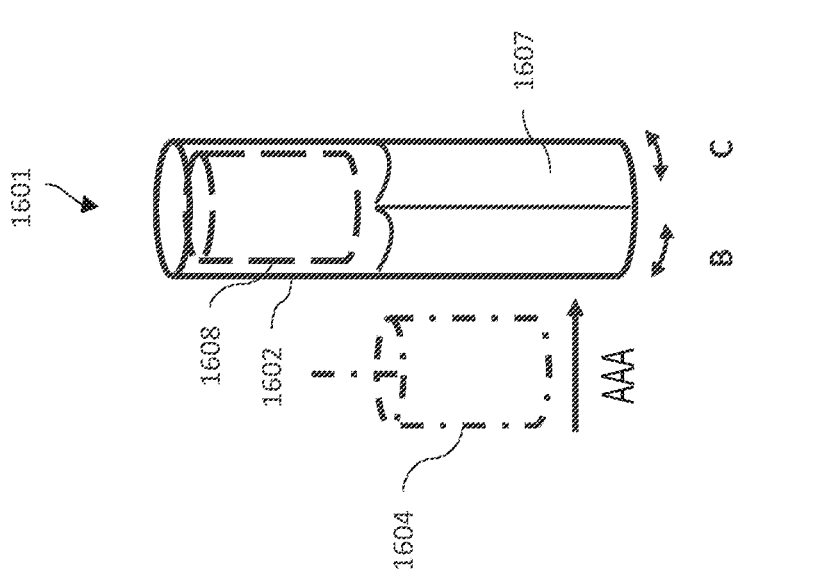
FIG. 16

1800

1802 Provide a dental floss dispenser

1804 Remove the dispensing portion from the interior portion of the dispenser housing 1806 Insert the wound string of dental floss into the storage chamber 1808 Extract a portion of the wound string of dental floss from the storage chamber and position the extracted portion of the wound string of dental floss across the floss dispensing cavity 1810 Place the dispensing portion into the interior portion of the dispenser housing

FIG. 18

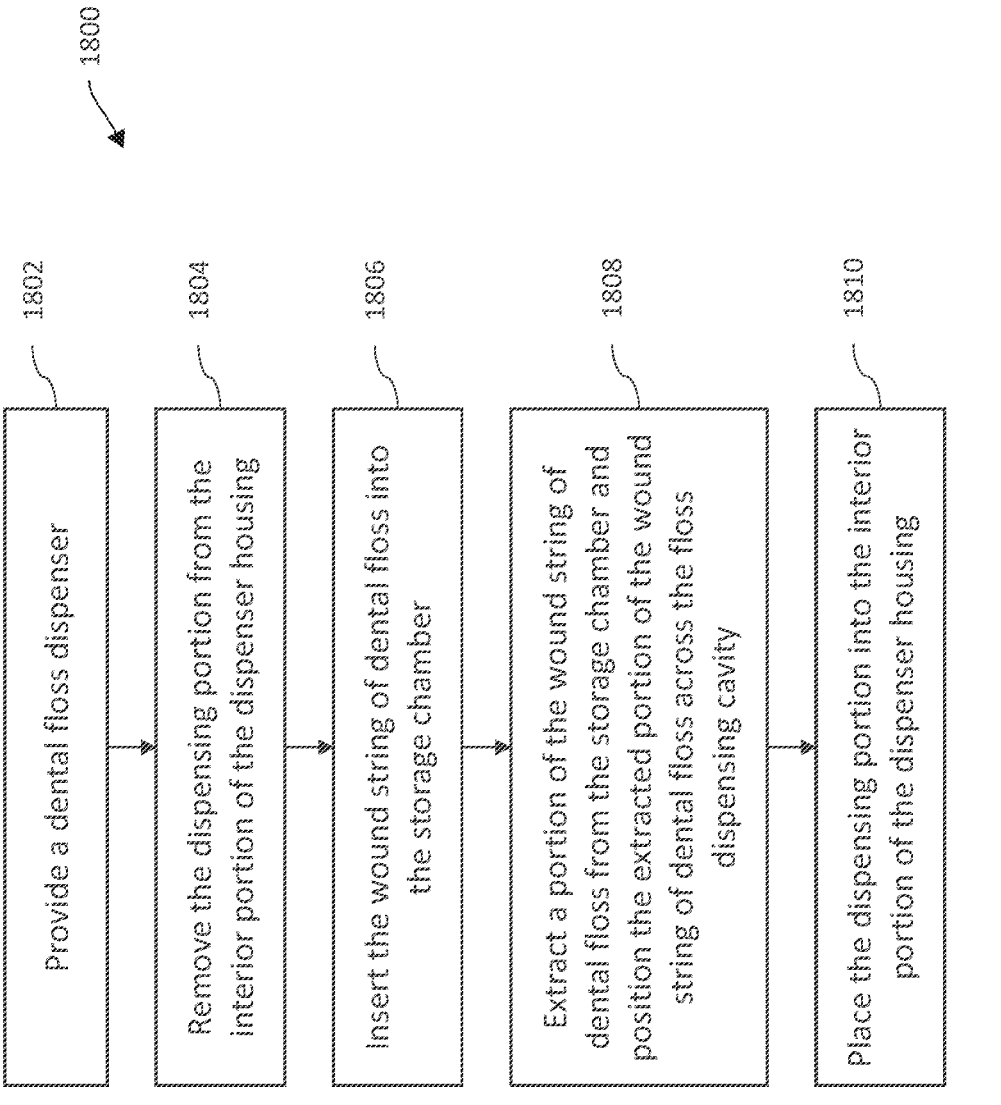

DENTAL FLOSS DISPENSER

CROSS-REFERENCE TO RELATED APPLICATIONS

The present application is a continuation of International Pat. App. Ser. No. PCT/US20/70519, filed Sep. 10, 2020, which claims priority to U.S. Provisional Pat. App. No. 62/900,930, filed Sep. 16, 2019, with the entirety of each of these applications incorporated herein by reference.

TECHNICAL FIELD

In some implementations, the current subject matter generally relates to dental instruments and, in particular, to a dental floss holder and a method of use.

BACKGROUND

To maintain good oral health, it is recommended that teeth are not only brushed but also flossed using a dental floss. Dental floss typically comes in a string form and is generally dispensed from a bobbin contained within a dispenser housing. A cutting device is used to cut a desired length of dental floss string. A user can then use the cut length of floss string to insert it between the teeth for flossing. Other variations of dental floss appliances include pre-fabricated picks having a short piece of floss spanning across two supports. These picks generally come in packs and are single use items. Once used, the entire pick and used floss are discarded. There is a need to provide a more efficient and effective way of storing and dispensing of dental floss.

SUMMARY

In some implementations, the current subject matter relates to a dental floss dispenser. The dispenser may include a dispenser housing having an interior portion and a dispensing portion slidably disposed inside the interior portion of the dispenser housing. A wound string of dental floss may be disposed within a dental floss housing portion. The dental floss housing portion may be removably coupled to the dispensing portion. The dispenser may further include a locking mechanism configured to temporarily retain the dispensing portion and the dental floss housing portion in the interior portion of the dispenser housing. A portion of the wound string of dental floss may be configured to protrude through one or more openings in the dispensing portion.

In some implementations, the current subject matter relates to a method for loading the dental floss dispenser. To load the dispenser, a user may push on a top of the dispensing portion and remove an interlocked assembly of the dispensing portion and the dental floss housing from the interior portion of the dispenser housing. In some implementations, a spring (along with optional damper ring) may be retained inside the dispenser housing. Alternatively, the spring (and/or the damper ring) may be removed. The user may then disengage the floss housing from the dispensing portion. If previous dental floss (or any remains of the wound dental floss) is present in the dental floss housing, the user may remove it (e.g., the dental floss may be retracted from the openings in the dispensing portion by pulling on it). If no dental floss is present, a new wound length of dental floss may be positioned inside the dental floss housing. Then, a laminated end of the new wound length of dental floss may be protruded through openings in the dispensing portion, thereby extending it from the top of the dispensing portion. The dental floss housing may then be interlocked with the dispensing portion creating the interlocked assembly. The interlocked assembly may then be inserted into the interior portion of the dispenser housing (if spring and/or damper ring were previously removed from the interior portion, the damper ring is positioned first on the base and following by the spring). The user may then push the interlocked assembly further into the interior portion of the dispenser housing until a first latch portion and a second latch portion of the locking mechanism engage.

To use the dispenser, the user may push on its top portion, thereby causing disengagement of the first and second latch portions and ejecting/partially removing the dispensing assembly from the interior portion. A desired length of string of dental floss may be pulled a concave cavity of the dispensing portion and protruded through one or more openings in the dispensing portion to allow cutting the dental floss using one or more cutting blades. Once flossing is complete, the user may push on the top portion to secure the dispensing portion in the interior portion.

In some implementations, the current subject matter relates to a dental floss dispenser. The dental floss dispenser may include a dispenser housing enclosing an interior portion and a dispensing portion slidably positioned inside the interior portion of the dispenser housing. The dispensing portion may have a stored position and a dispensing position. In the stored position, the dispensing portion may be entirely disposed in the interior portion. In the dispensing position, the dispensing portion may be partially disposed outside of the interior portion. The dispensing portion may further include a storage chamber for storing a wound string of dental floss and a floss dispensing cavity for holding at least a portion of the wound string of dental floss extracted from the storage chamber.

In some implementations, the current subject matter may include one or more of the following optional features. The dental floss dispenser may further include a locking mechanism configured to temporarily retain the dispensing portion in stored position or the dispensing position. The locking mechanism may include a spring component and a latching component. The spring component, upon unlocking of the latching component, may be configured to position the dispensing portion in the dispensing position. The latching component, upon locking, may be configured to retain the dispensing portion in the stored position.

In some implementations, the dispensing portion may be configured to be entirely removable from the interior portion of the dispenser housing. The wound string of dental floss may be configured to be removable from the storage chamber upon entire removal of the dispensing portion from the interior portion of the dispenser housing. The wound string of dental floss may be configured to be wound in a coreless manner. In some implementations, a support structure may be configured to wrap the wound string of dental floss. The support structure may be configured to adhesively wrap the wound string of dental floss. The wound string of dental floss may be further configured to unwind from an interior of the wound string of dental floss. The wound string of dental floss may be configured to have one or more exterior dimensions smaller than one or more interior dimensions of the storage chamber. The wound string of dental floss may include a laminated end. The wound string of dental floss may be configured to be wound in at least one of the following shapes: a cylinder, a tube, a roll, a torus, a sphere, a cone, a prism, an ellipsoid, a helix, and any combination thereof.

In some implementations, the dispensing portion may include a concave open cavity having a top and a bottom, a first opening disposed in the bottom and configured for protruding the portion of the wound string of dental floss from the storage chamber, and a second opening disposed in the top and configured for holding the protruded portion of the wound string of dental floss. The second opening of the concave open cavity may include a cutting mechanism for cutting the dental floss.

In some implementations, the dispenser housing may include a stopping mechanism disposed in the interior portion proximate to a top of the dispenser housing. The dispensing portion may include one or more protrusions disposed on an exterior surface of the dispensing portion. The stopping mechanism may be configured to interact with one or more protrusions to temporarily prevent removal of the dispensing portion from the interior portion of the dispenser housing.

In some implementations, the storage chamber may be configured to be interlocked with the floss dispensing cavity for holding the wound string of dental floss.

In some implementations, the current subject matter relates to a method of loading the dental floss dispenser described above. The method may include providing the dental floss dispenser, as described above, removing the dispensing portion from the interior portion of the dispenser housing, inserting the wound string of dental floss into the storage chamber, extracting at least a portion of the wound string of dental floss from the storage chamber and positioning the extracted portion of the wound string of dental floss across the floss dispensing cavity, and placing the dispensing portion into the interior portion of the dispenser housing.

In some implementations, the current subject matter relates to a method of using the dental floss dispenser described above. The method may include providing the dental floss dispenser, as described above, partially removing the dispensing portion from the interior portion of the dispenser housing, extracting at least a portion of dental floss from the storage chamber and securing the extracted portion to the floss dispensing cavity, using the dental floss dispenser for flossing, and placing the dispensing portion into the interior portion of the dispenser housing.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIGS. 1A-B illustrate perspective top and bottom views, respectively, of the dental floss dispenser, according to some implementations of the current subject matter;

FIGS. 3A-3C illustrate the dental floss dispenser shown in FIGS. 1A-B with the dispensing portion being ejected or partially removed from the interior portion, according to some implementations of the current subject matter;

FIG. 9-14 illustrate various exemplary dental floss dispensers, according to some implementations of the current subject matter;

FIGS. 15-16 illustrate various exemplary processes for loading dispensers (e.g., dispensers shown in FIGS. 1A-14) with a dental floss, according to some implementations of the current subject matter;

FIG. 18 illustrates an exemplary method for loading a dental floss dispenser, according to some implementations of the current subject matter.

DETAILED DESCRIPTION

Figure 2B:
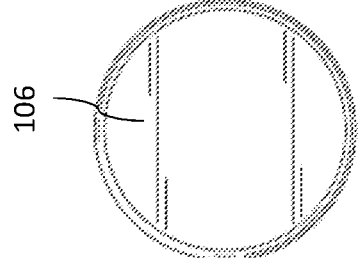
FIGS. 2A-B illustrate top and bottom views, respectively, of the top and bottom portions of the dispenser shown in FIGS. 1A-B.
Figure 2A:
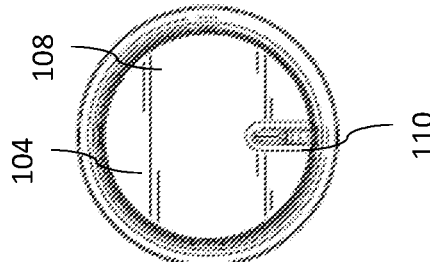

In some implementations, the current subject matter relates to a dental floss dispensing mechanism and methods of use. FIGS. 1A-B illustrate perspective top and bottom views, respectively, of the dental floss dispenser 100. The dental floss dispenser 100 may include a housing 102 having a hollow interior portion 112, a top portion 104, and a bottom portion 106. FIGS. 2A-B illustrate top and bottom views, respectively, of the top and bottom portions 104, 106. The interior portion 112 of the housing 102 may be sized to hold a dispensing portion 108 that may be configured to be ejected and/or removed from the interior portion 112. The housing 102 may be configured to have a cylindrical shape. As can be understood, the housing 102 may have any other shape, e.g., cube, parallelogram, and/or any other desired shape. The bottom portion 106 may be configured to have a circular shape and may be coupled to the housing 102 by any desired means (e.g., glued, welded, detachably attached, forming a unitary structure with the housing 102, etc.).

In a stored position, the dispensing portion 108 may be disposed entirely within the housing 102, as shown in FIGS. 1A-B. In this position, the top of the dispensing portion 108 may be flush with the top portion 104. In an ejected/partially removed position, the dispensing portion 108 may be removed from the interior portion 112, as shown in FIGS. 3A-C. In some implementations, the dispensing portion 108 may also be entirely removed from the interior portion 112.

As stated above, the dispensing portion 108 may be configured to be ejected/removed/partially removed from the top portion 104 of the housing 102. The dispensing portion 108 may be ejected/removed/partially removed using a spring and/or a latch mechanisms disposed in the interior portion 112 of the housing 102 (not shown in FIGS. 1A-2B). The dispensing portion 108 may be ejected/removed/partially removed from the top portion 104 of the housing 102 by application of a downward force on and subsequent release of the top of the dispensing portion 108, thereby allowing the dispensing portion 108 to "pop out"

from the interior portion 112 of the housing 102 (as shown in FIGS. 3A-C). The dispensing portion 108 may be returned to the interior portion 112 of the housing 102 by application of the downward force on the top of the dispensing portion 108 and pushing the dispensing portion 108 into the interior portion 112 until the dispensing portion 108 is locked inside the interior portion 112 using a locking mechanism (not shown in FIGS. 1A-2B).

The dispensing portion 108 may also include a cutting mechanism 110 that may be used to cut a desired length of a string of dental floss protruding from an interior of the dispensing portion 108. The cutting mechanism 110 may include one or more cutting blades that may be used by a user of the dental floss dispensing mechanism 100 to cut the string of dental floss. The cutting blades may be disposed inside an opening 114 disposed in the top of the dispensing portion 108.

In some implementations, the dispensing portion 108 may be configured to have a size (e.g., a diameter) that is smaller than an interior diameter of the interior portion 112. This may allow ejection/removal/partial removal of the dispensing portion 108 from the interior portion 112. In some exemplary implementations, a difference in the diameter of the dispensing portion 108 and the interior diameter of the interior portion 112 may create a small cylindrical space that may allow ease of ejection/removal/partial removal of the dispensing portion 108 from the interior portion 112.

FIGS. 3A-C illustrate the dental floss dispenser 100 with the dispensing portion 108 being ejected or partially removed from the interior portion 112 (perspective, front, and side views are shown in FIGS. 3A-C, respectively). The dispensing portion 108 may include a dental floss holding section 306 disposed below a top portion 302.

As shown in FIGS. 3A-C, the dental floss holding section 306 may include a concave section 308 having a top portion 311 and a bottom portion 313. The concave section 308 may be configured to accommodate placement of user's fingers to pull on a string of floss from an interior of the dispensing portion 108. The top portion 311 may be configured to include an entry port 315 for the cutting mechanism 110. The bottom portion 313 may be configured to include an opening 304. A string of dental floss 320 may be configured to protrude from an interior of the dispensing portion 108 through the opening 304 and into the entry port 315. In some implementations, one or more floss holding mechanisms may be disposed inside the opening 304 and/or entry port 315 to ensure that the floss is held in position before and/or after cutting. The holding mechanisms (e.g., spring-loaded clips, etc.) may allow the user to pull on a string of dental floss protruding from the top portion 302 of the dispensing portion 108 and once a sufficient length of dental floss is pulled out, the mechanisms may retain the dental floss between the top and bottom portions 311, 313 in a tensioned state.

Figure 4:
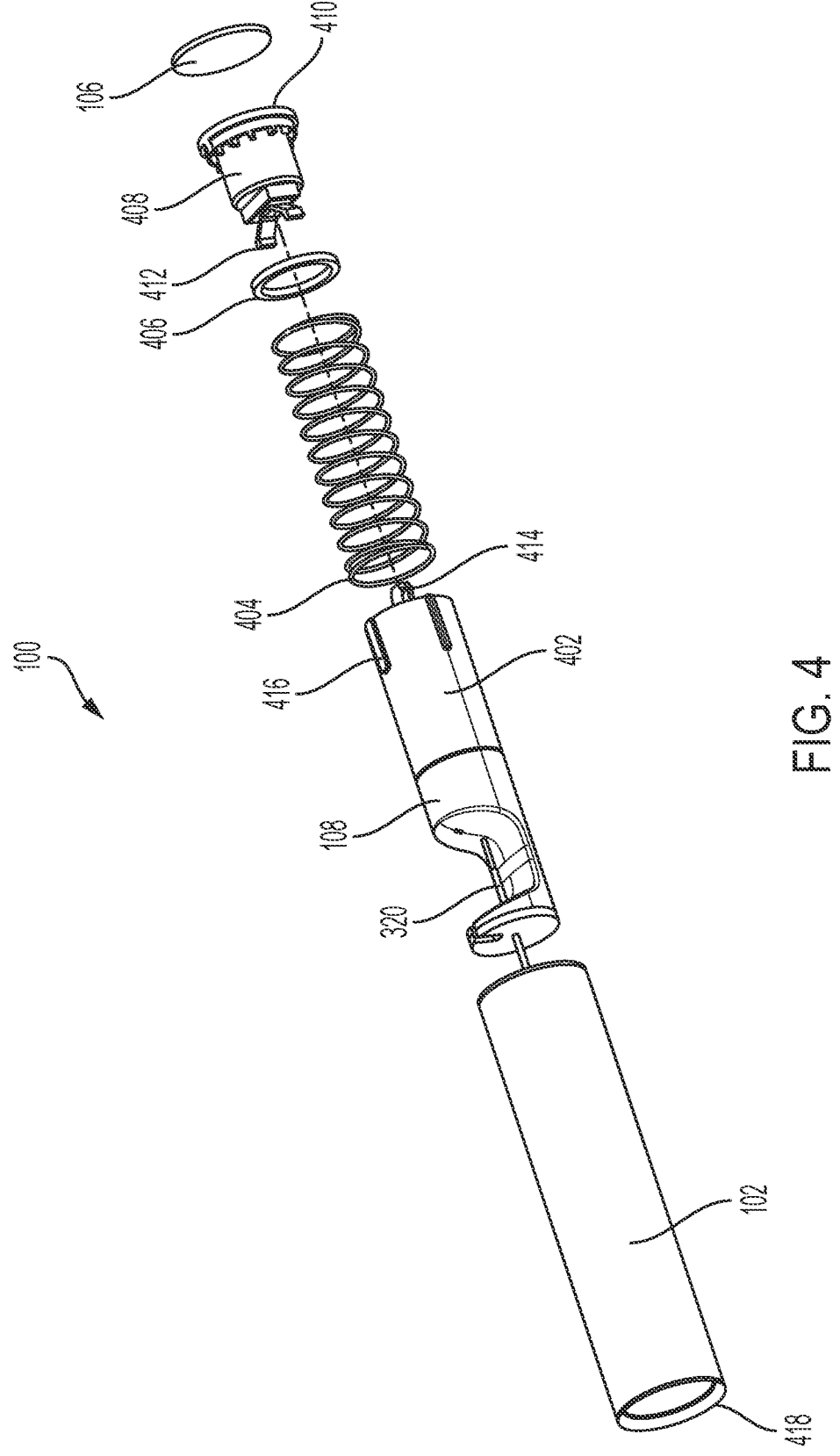
FIG. 4 illustrates an exploded view of the dental floss dispenser shown in FIGS. 1A-B.
Figure 7:
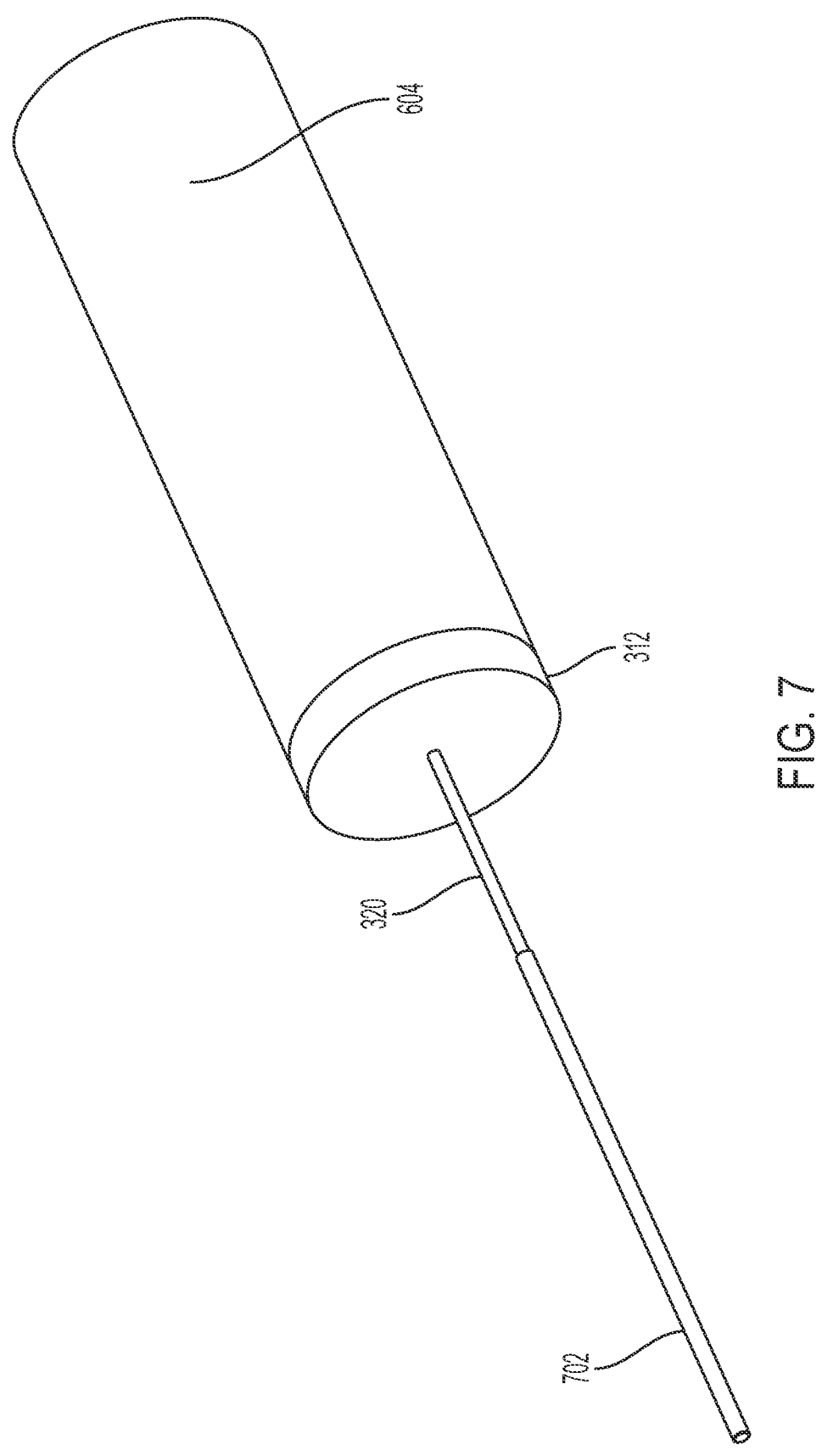
FIG. 7 illustrates the wound string of dental floss, according to some implementations of the current subject matter.

FIG. 4 illustrates an exploded view of the dental floss dispenser 100. As shown in FIG. 4, in addition to the dispensing portion 108, one or more of the following components may be disposed in the interior portion 112 of the housing 102: a floss housing 402 coupled to a first or a male latch portion 414, an ejection spring 404, an optional damper ring 406, a latch housing 408 having a bottom portion 410 and a second or female latch portion 412. The floss housing 402 may be configured to be removably coupled to the dispensing portion 108 and may be further configured to hold a wound length of dental floss 320 (e.g., as a bobbin, a roll, a coil, etc. (as shown in FIG. 7). The wound length of dental floss 320 may be interchangeably positioned inside the floss housing 402. For example, a new wound length of dental floss 320 may be positioned inside the floss housing 402 upon the user of the dental floss dispenser 100 running out of the previous wound length of dental floss or simply desiring a different dental floss (e.g., thicker, thinner, different flavor, etc.).

The floss housing 402 may include the first latch portion 414 that may be configured to interact with the second latch portion 412 to temporarily hold an interlocked assembly of the dispensing portion 108 and the floss housing 402. The holding of interlocked assembly of the dispensing portion 108 and the floss housing 402 may occur when the user of the dispenser 100 applies a downward force on the top of the dispensing portion 108 to push the dispensing portion 108 into the interior portion 112, whereby the first latch portion 414 may come in contact with and subsequently engage the second latch portion 412 to temporarily hold or lock the interlocked assembly inside the interior portion 112. To unlock the temporary hold of the interlocked assembly, the user may again apply a downward force to the top of the dispensing portion, thereby causing a disengagement of the first latch portion 414 from the second latch portion 412. Once disengaged, the string spring 404 may apply force to the bottom of the floss housing 402 and push the dispensing portion 108 away from the interior portion 112 of the housing 102.

The second latch portion 412 may be positioned inside a latch housing 408 disposed on a latch base 410. The latch base 410 may be configured to be coupled to interior walls of the housing 102 (e.g., glued, welded, ultrasonically welded, etc.). In some implementations, the latch base 410 may be further configured to be coupled to the bottom portion 106 (e.g., using a glue, welding, ultrasonic welding, etc.). The latch base 410 may have substantially identical size (e.g., diameter) to the bottom portion 106, whereby the bottom portion 106 may have a diameter that is substantially equal to interior diameter of interior portion 112 of the housing 102. The latch housing 408 may be configured to be coupled to the latch base 410 (e.g., using a glue, welding, ultrasonic welding, etc.). In some implementations, the latch housing 408 may include a hollow interior portion configured to accommodate positioning of the second latch portion 412 (which is shown in further detail in FIG. 8). The second latch portion 412 may be permanently secured inside the hollow interior portion of the latch housing 408.

The spring 404 may be configured to have a larger diameter than the exterior diameter of the latch housing 408 to allow positioning of the spring 404 over the latch housing 408. Further, the diameter of the spring 404 may be smaller and/or substantially equal to the exterior diameter of the floss housing 402 (which, in turn, may be substantially similar to the diameter of the dispensing portion 108). In some exemplary implementations, the optional damper ring 406, having an interior diameter greater than the exterior diameter of the housing 408 may be positioned over housing 408 to provide dampening for the spring 404. The damper ring 406 may be sufficiently large enough to fit inside the housing 102 and accommodate positioning of the spring 404 on top of it.

In some implementations, the floss housing 402 may be configured to include one or more protrusions 416 disposed proximate to the first latch portion 414, as shown in FIG. 4. The protrusions 416 may be configured to interact with an interior lip 418, disposed proximate to the top of the housing 102, to prevent accidental removal of the interlocked assembly of the dispensing portion 108 and the floss housing 402. Alternatively, the protrusions 416 may interact with one or more corresponding guides and/or stoppers disposed inside the interior portion 112 of the housing 102 to guide the dispensing portion 108 in and out of the interior portion 112.

Figure 5:
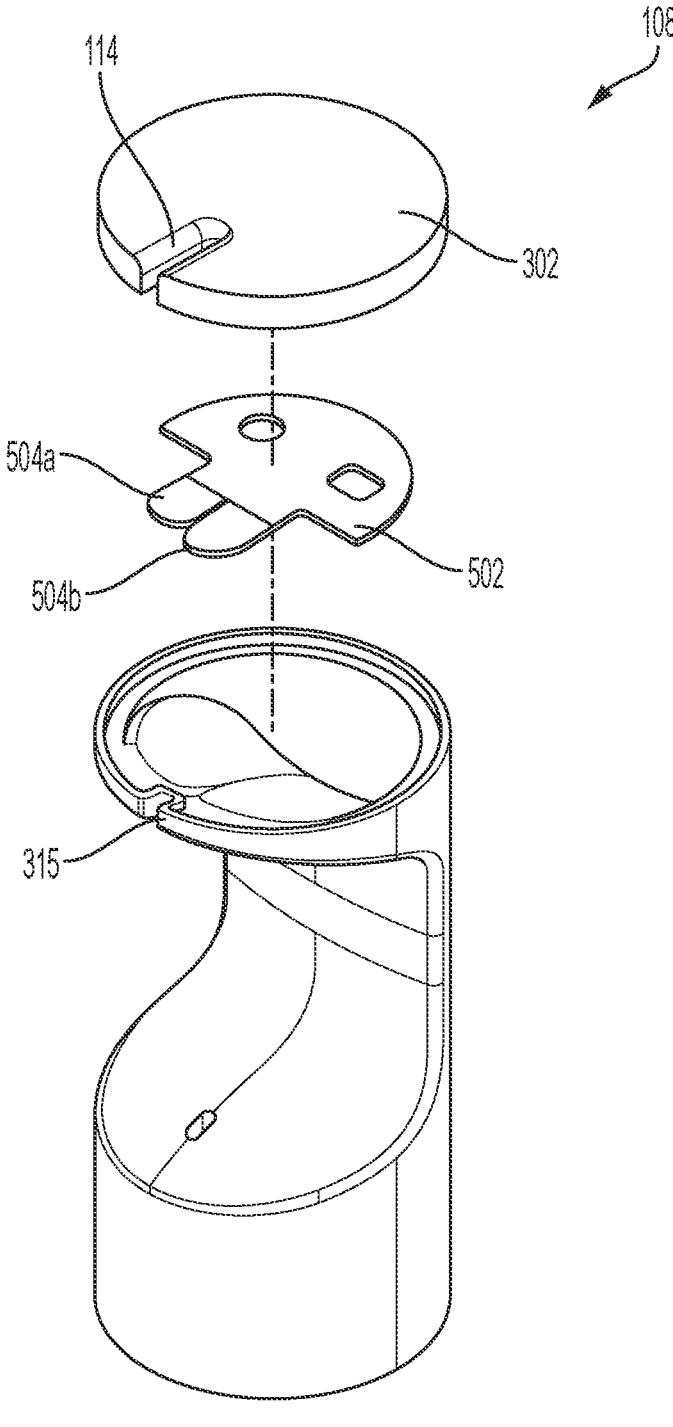
FIG. 5 illustrates an exploded view of the dispending portion of the dental floss dispenser shown in FIGS. 1A-B.

FIG. 5 illustrates an exploded view of the dispensing portion 108 of the dental floss dispenser 100. As stated above, the dispensing portion 108 may include the cutting mechanism 110. The cutting mechanism 110 may include a cutter 502 having cutting blades 504 (a, b). The cutter 502 may be positioned inside a housing of the dispensing portion 108. It may be glued, welded, ultrasonically welded, etc. to any portion of the housing of the dispensing portion 108. The blades 504 a and 504 b may be positioned to ensure that the floss may be protruded through the openings 114 and 315 and between the blades 504 a, 504 b. The blades 504 may be sufficiently sharp to allow cutting of dental floss having any desired thickness. In some implementations, the blades 504 may be positioned at a different angle with respect to one another and/or a plane of the cutter 502. To cut a desired length of a string a dental floss, the user may pull the desired length of floss from the opening 114 and then, tilt it to allow cutting on one of the blades 504.

Figures 6A, 6B:
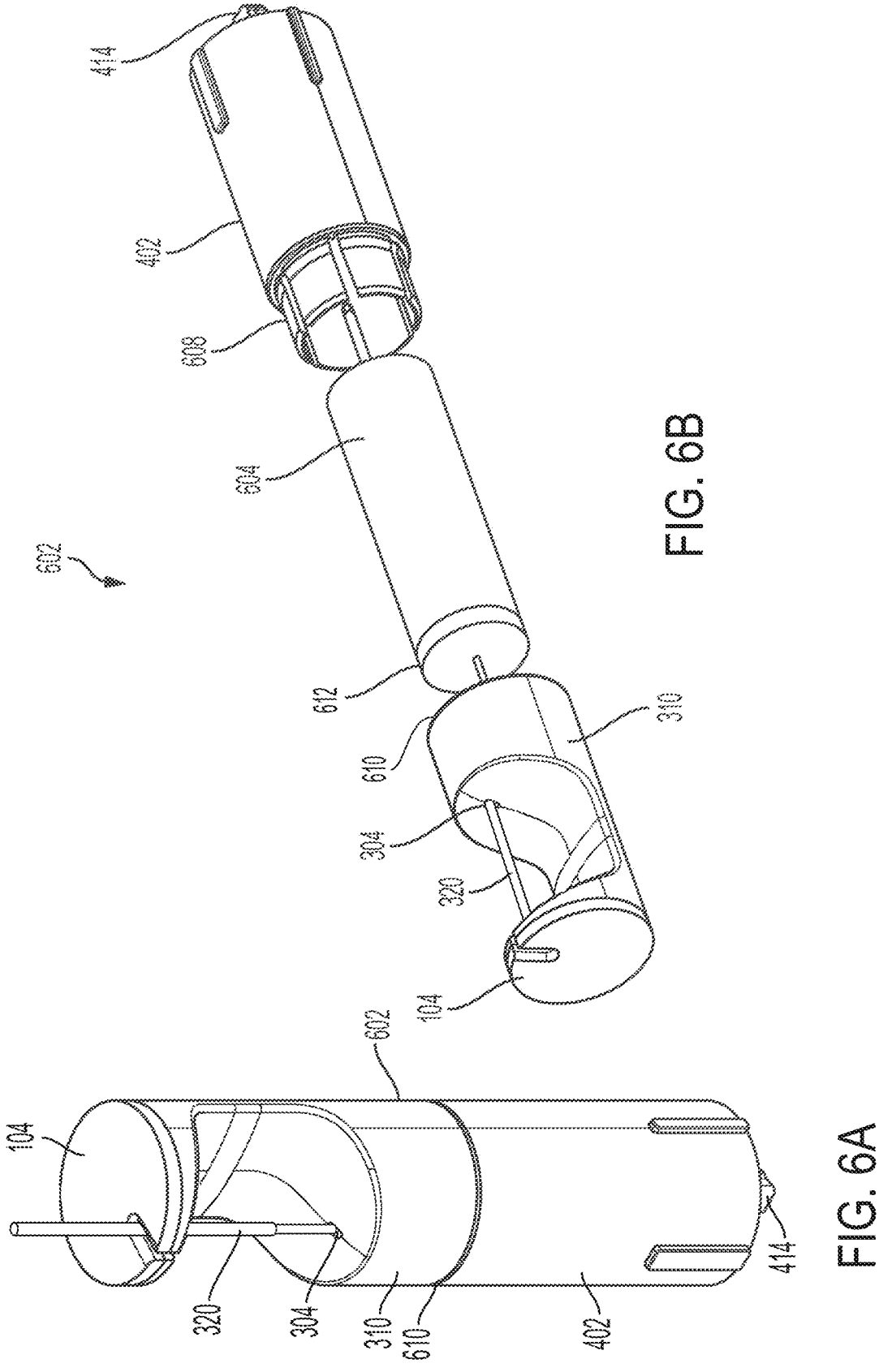
FIGS. 6a and 6b illustrate an assembled view and an exploded view, respectively of an assembly of the dispensing portion and the floss housing, according to some implementations of the current subject matter.

FIG. 6a illustrates an assembled view and an exploded view FIG. 6b of an assembly 602 of the dispensing portion 108 and the floss housing 402. For interlocking of the dispensing portion 108 and the floss housing 402, the floss housing 402 may include one or more curved protrusions 608 that may be disposed proximate to the top of the floss housing 402. The protrusions 608 may have a curvature that may be substantially similar to the interior curvature of the bottom portion 610 of the dispensing portion 108. The radius of the curvature of the protrusions 608 may be smaller than the interior radius of the bottom portion 610 to allowing snap-fitting of the protrusions 608 inside the bottom portion 610 to create the interlocked assembly 602, as shown in FIG. 6b.

A wound string of dental floss 604 (e.g., a bobbin, a coil, etc.) may have a diameter that may be smaller than the interior diameter of the floss housing 402 to allow positioning of the wound string of dental floss 604 inside the floss housing 402. A free end of the dental floss 320 may be configured to protrude from a top 612 of the wound string of dental floss 604 for insertion through the opening 304 in the dispensing portion 310 (which may share features with or may be analogous with dispensing portion 108 described herein).

FIG. 7 illustrates the wound string of dental floss 604. As stated above, the string of floss 320 may be configured to protrude from the top portion 612. In some implementations, the string of floss 320 may include a laminated end 702 to allow for ease of insertion through the openings 304, 315 prior to first use (not shown in FIG. 7). The laminated end 702 may have a harder consistency than the remainder of the dental floss and may be discarded once the dental floss dispenser 100 is ready for its use.

Figure 8:
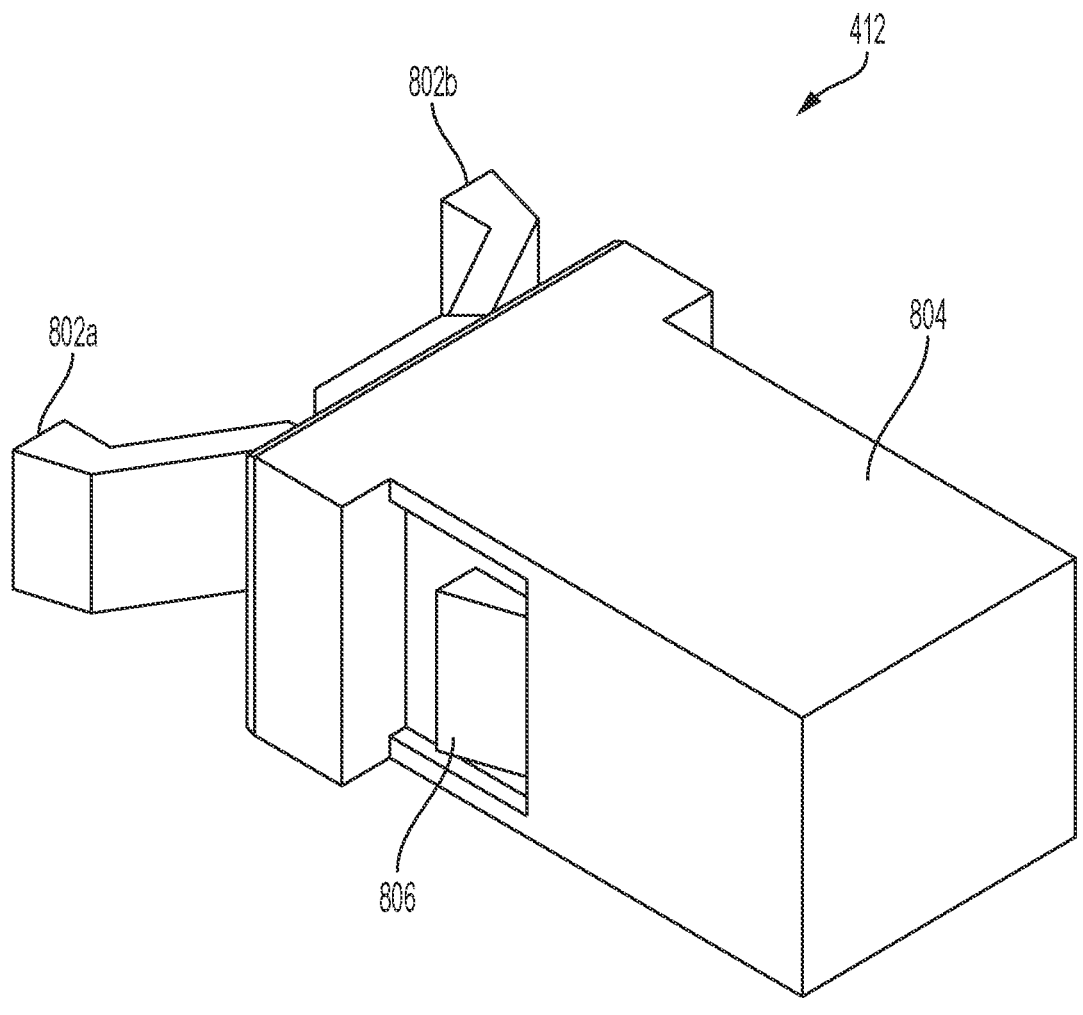
FIG. 8 illustrates the second or female latch portion, according to some implementations of the current subject matter.

FIG. 8 illustrates the second or female latch portion 412. The second latch portion 412 may be any known push latch that may be configured to accommodate insertion of the first latch portion 414. It may have a base portion 804 that may be configured to be secured within the latch housing 408 (not shown in FIG. 8), one or more prongs 802 (a, b), and a push lock 806. Once the first latch portion 414 engages the prongs 802 (e.g., by having the prongs 802 rotate in a scissor-like fashion around the first latch portion 414), the push lock 806 may be configured to engage the base portion 804, thereby preventing unlocking of the prongs 802 from the first latch portion 414. Upon application of sufficient pressure, the push lock 806 may be configured to disengage from the base portion, thereby releasing or unlocking of the prongs 802 from the first latch portion 414. The applied pressure may be a combination of the user pressure on the top of the dispensing portion 108 and the spring 404 (not shown in FIG. 8).

In some implementations, to load the dispenser 100, the user may push on the top of the dispensing portion 108 and then remove the interlocked assembly 602 (shown in FIG. 6) from the interior portion of the housing 102. In some implementations, the spring 404 (along with optional ring 406 (shown in FIG. 4)) may be retained inside the housing 102. Alternatively, the spring 404 (and/or the ring 406) may be removed. The user may then disengage the floss housing 402 from the dispensing portion 108. If previous dental floss (or what remains of the wound dental floss 604) is present in the housing 402, the user may remove it (e.g., the dental floss may be retracted from the openings 304, 315 by pulling on it). If no dental floss is present, a wound length of dental floss 604 may be positioned inside the housing 402. Then, the laminated end 702 may be protruded through opening 304 and then opening 315, thereby extending it from the top of the dispensing portion 108. The housing 402 may then be interlocked with the dispensing portion 108 creating the interlocked assembly 602. The interlocked assembly 602 may then be inserted into the interior portion 112 of the housing 102 (if spring 404 and/or ring 406 were previously removed from the interior portion 112, the ring 406 is positioned first on the base 408 and following by the spring 404 (as shown in FIG. 4)). The user may then push the interlocked assembly 602 further into the interior portion 112 of the housing 102 until first latch portion 414 and the second latch portion 412 engage.

To use the dispenser 100, the user may push on the top portion 104, thereby causing disengagement of the first and second latch portions 414, 412 and ejecting/partially removing the dispensing assembly 108 from the interior portion 112. A desired length of string of dental floss 320 may be pulled the concave cavity 308 and protruded through the opening 315 of the cutting mechanism 110 to allow cutting the dental floss using cutting blades 504. Once flossing is complete, the user may push on the top portion 104 to secure the dispensing assembly 108 in the interior portion 112. As can be understood, any means of securing the dispensing portion may be used (e.g., hook(s), latch(es), ball-and-chain mechanism(s), etc.). The current subject matter is not limited to the use of the latching mechanism shown in FIGS. 1A-8. Moreover, the current subject matter is not limited to the ways of loading dental floss into the dispenser.

Figure 9:
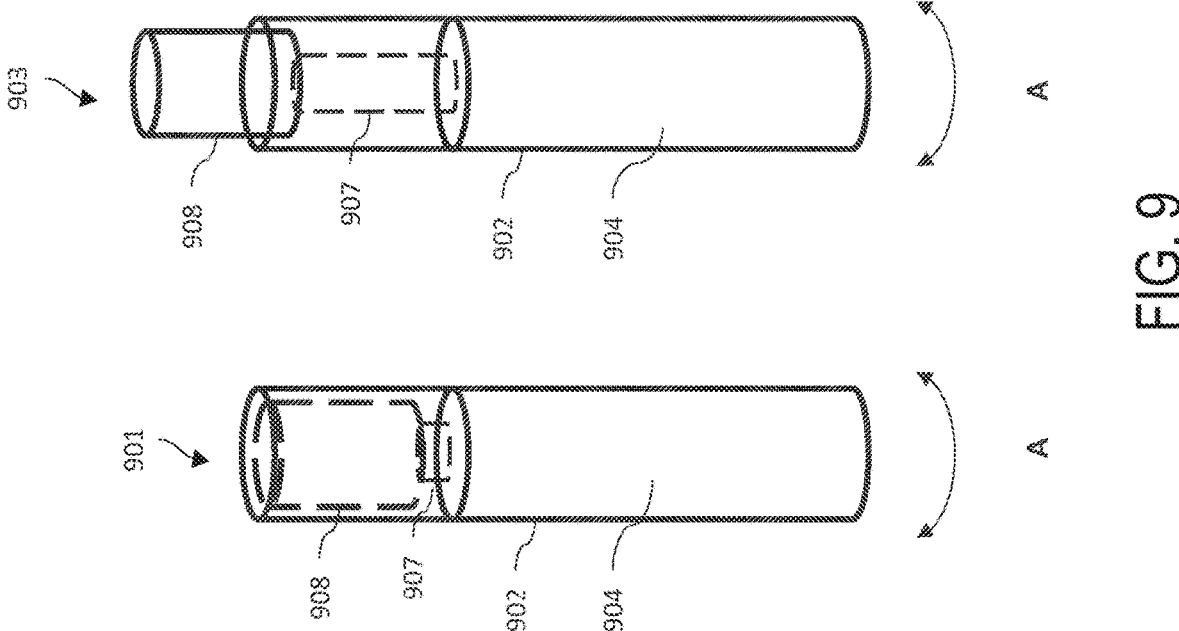

FIG. 9 illustrates an exemplary dispenser 900, according to some implementations of the current subject matter. The dispenser 900 may be similar to the dispenser shown in FIGS. 1A-8. In particular, it includes a housing 902 and dispensing portion 908 that may be configured to be ejected/partially removed/entirely removed from an interior portion of the housing 902. To remove the dispensing portion 908, the housing 902 may include a rotating portion 904 that may be configured to rotate in a direction A around vertical axis (i.e., axis parallel to the long side of the housing 902). A rod 907 may be configured to be disposed inside the housing 902 and may be configured to be coupled (permanently, temporarily, etc.) to the dispensing portion 908 and the rotating portion 904. The rod 907 may be configured to have one or more threads disposed thereon along extension of the rod 907 that may allow it to be threaded in and out of the rotating portion 904. Rotation of the portion 904 (e.g., in a clockwise direction A) may be configured to rotate or extend the rod 907 and to push dispensing portion 908 out from the interior portion of the housing 902 (state 903). Rotation of the portion 904 in an opposite direction (e.g., counter-clockwise direction) may be configured to thread the rod 907 in the corresponding direction and to pull the dispensing portion 908 into the interior portion of the housing 902 (state 901). As can be understood, any methods of pushing out or pulling in the dispensing portion 908 using the rotating portion 904 are possible (e.g., using a screw, a piston, a push button, a spring, a tension-based mechanism, an elastic band, a telescoping rotation device, etc.).

Figure 10:
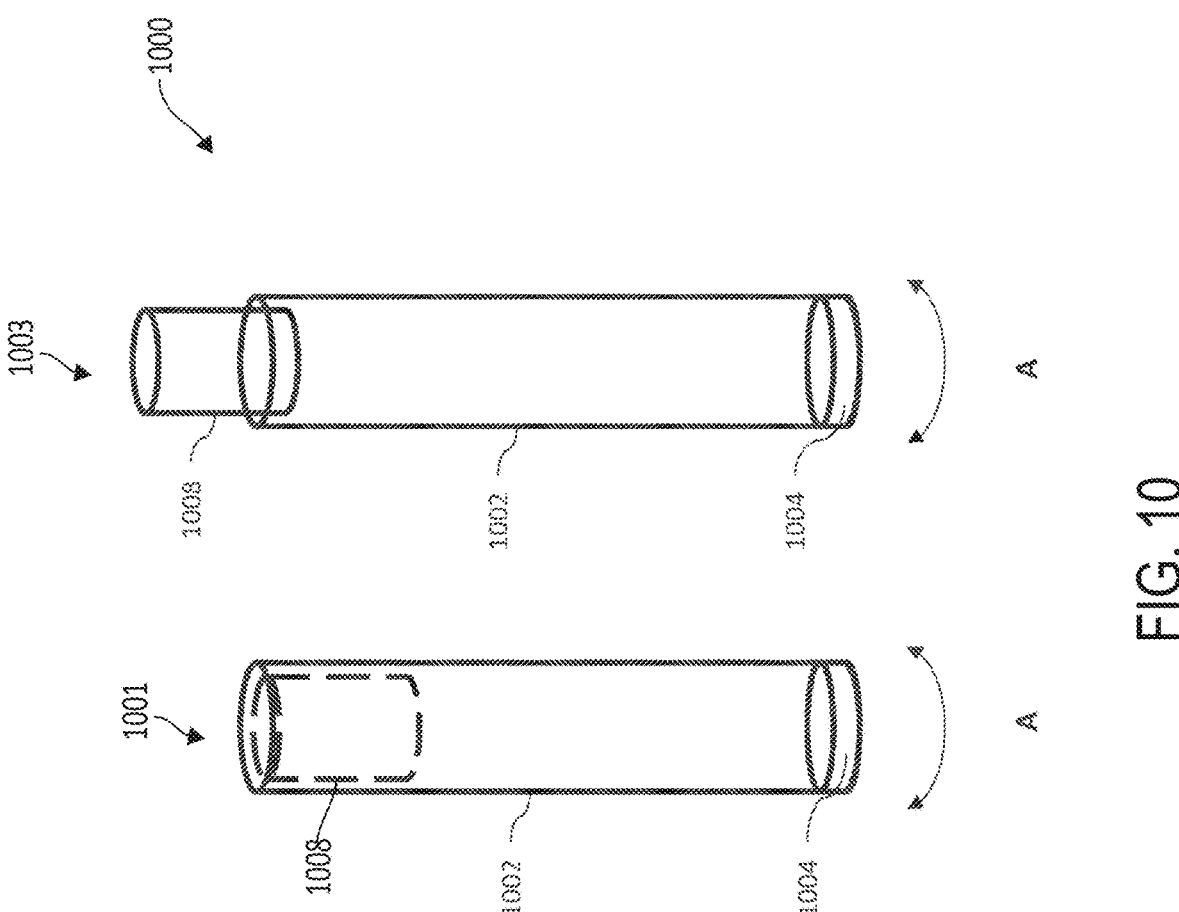

FIG. 10 illustrates another exemplary dispenser 1000, according to some implementations of the current subject matter. The dispenser 1000 may be similar to the dispensers shown in FIGS. 1A-9. In particular, it includes a housing 1002 and dispensing portion 1008 that may be configured to be ejected/partially removed/entirely removed from an interior portion of the housing 1002. To remove the dispensing portion 1008, the housing 102 may include a rotating portion 104 that may be configured to rotate in a direction A around vertical axis (i.e., axis parallel to the long side of the housing 1002). The portion 1004 may be configured to be disposed substantially at an end of the dispenser 1000 that distal to the end of the dispensing portion 1008. Similar to FIG. 9, rotation of the portion 1004 (e.g., in a clockwise direction A) may be configured to push dispensing portion 1008 out from the interior portion of the housing 1002 (state 1003). Rotation of the portion 1004 in an opposite direction (e.g., counter-clockwise direction) may be configured to pull the dispensing portion 1008 into the interior portion of the housing 1002 (state 1001). As can be understood, any methods of pushing out or pulling in the dispensing portion 1008 using the rotating portion 1004 are possible (e.g., using a screw, a piston, a push button, a spring, a tension-based mechanism, an elastic band, etc.). In some implementations, the user may be configured to use a user's finger to push on the portion 1004, thereby causing the dispensing portion 1008 to be ejected/partially removed/entirely removed from the interior portion of the housing 1002. To secure dispensing portion 1008 inside the housing 1002, the user may apply force to the top of the dispensing portion 1008, until it is entirely located within the housing 1002. Any means of securing the dispensing portion 1008 may be used (e.g., hook(s), latch(es), ball-and-chain mechanism(s), etc.).

Figure 11:
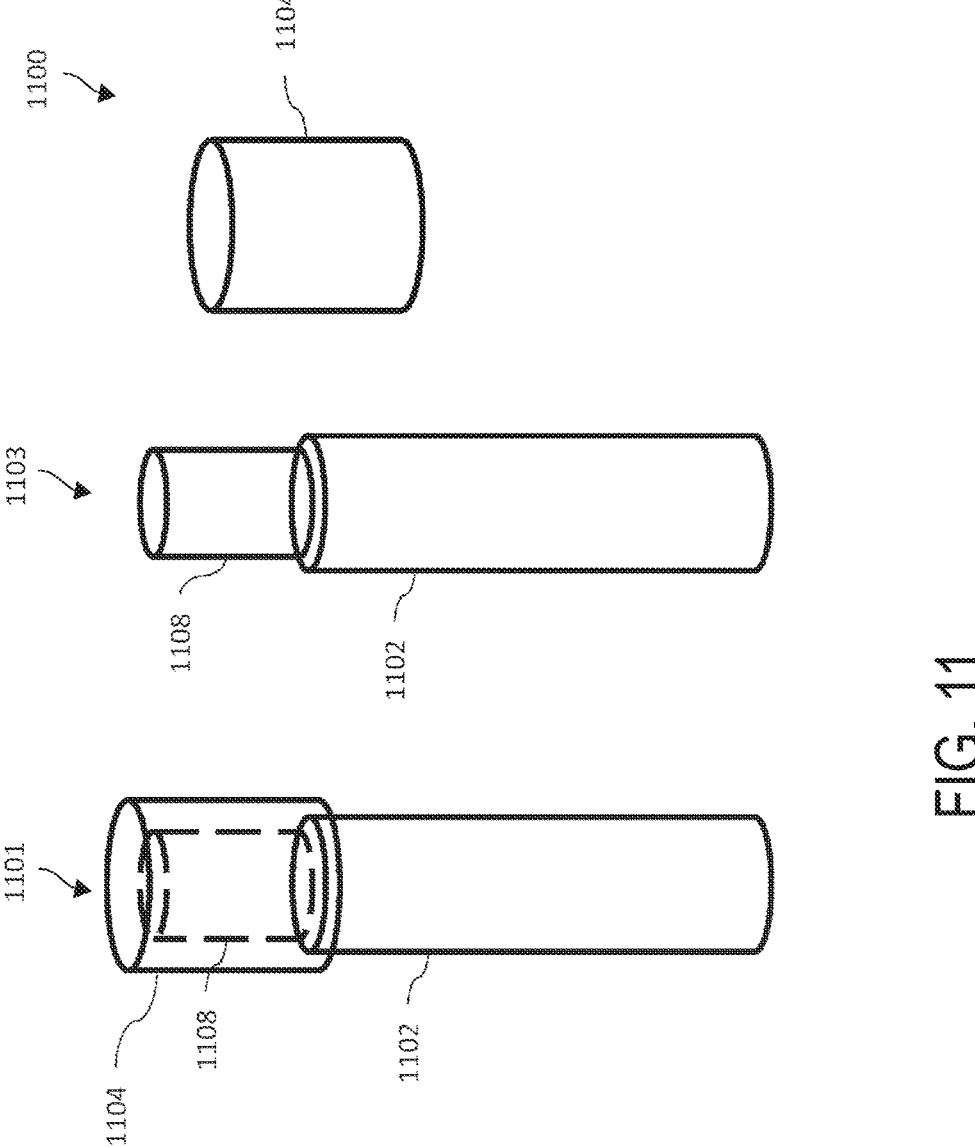

FIG. 11 illustrates yet another exemplary dispenser 1100, according to some implementations of the current subject matter. The dispenser 1100 may be similar to the dispensers shown in FIGS. 1A-10. In particular, it includes a housing 1102 and dispensing portion 1108. The housing may also include a cap 1104. The cap 1104 may be configured to be entirely removable (e.g., state 1103), partially removable (e.g., the cap 1104 may be coupled to the housing 1102 using a hinge, a spring-loaded hinge, a latch, etc.), etc. The cap 1104 may be screw cap, twist on/off cap, snap on/off cap, push/pull cap, friction-fit cap, and/or any other type of cap. The cap 1104 may be configured to conceal the dispensing portion 1108 (e.g., state 1101) when the dispensing portion is not in use. Alternatively, the cap 1104 may be configured to cover the top of the housing 1102, while the dispensing portion 1108 is contained inside the interior portion of the housing 1102 (e.g., as shown in FIGS. 1A, 9-10). To use the dispenser 1100, the user may remove the cap 1104 (e.g., state 1103), e.g., by twisting the cap off, by unscrewing it, by pulling on it, etc., and then use the dispensing portion 1108. Alternatively, the dispensing portion 1108 may also be ejected or partially removed from the interior portion of the housing 1102. Any means of securing and/or removing the cap 1104 to/from the housing 1102 may be used.

Figure 12:
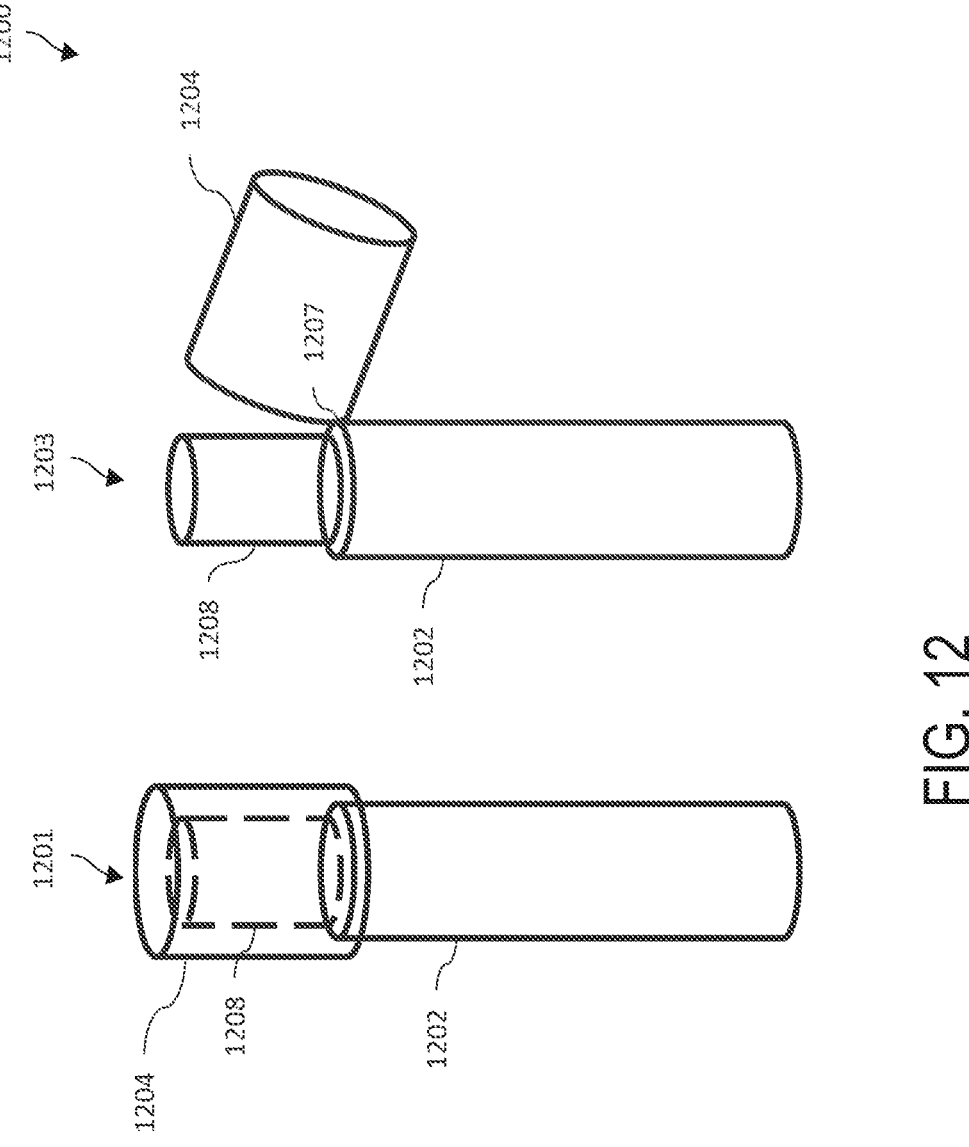

FIG. 12 illustrates yet another exemplary dispenser 1200, according to some implementations of the current subject matter. The dispenser 1200 may be similar to the dispenser 1100 shown in FIG. 11. The dispenser 1200 may include a housing 1202 and dispensing portion 1208. The housing may also include a flip cover and/or a hinged cover 1204. The cover 1204 may be configured to be hingedly coupled to the housing 1202 and may be configured to be opened (state 1203) and closed (state 1201) using, for example, a hinge 1207 Once the cover 1204 is opened (state 1203), i.e., rotated about the hinge 1207, the dispensing portion 1208 may be exposed (alternatively, the user may need to eject or partially remove the dispensing portion 1208, as discussed above) and the user may use the dispenser 1200 for flossing as discussed above. Any means of securing and/or removing the cover 1204 to/from the housing 1202 may be used.

FIG. 13 illustrates yet another exemplary dispenser 1300, according to some implementations of the current subject matter. The dispenser 1300 may be similar to the dispenser shown in FIG. 11. In particular, it includes a housing 1302 and dispensing portion 1308. The housing may also include a sliding cover 1304. The cover 1304 may be configured to be slide along an outer surface of the housing 1302 for the purposes of concealing the dispensing portion 1308 (e.g., state 1301) and exposing the dispensing portion 1308 (e.g., state 1303). The cover 1304 may slide on rails, roller balls, gears, etc. Alternatively, the sliding cover 1304 may be threaded on/off for the purposes of concealing/exposing the dispensing portion 1308. The cover 1304 may be configured to cover the top of the housing 1302 (similar to FIG. 11), while the dispensing portion 1308 is contained inside the interior portion of the housing 1302 (e.g., as shown in FIGS. 1A, 9-11). To use the dispenser 1300, the user may slide the cover 1304 down (e.g., state 1303) and then use the dispensing portion 1308. Alternatively, the dispensing portion 1308 may also be ejected or partially removed from the interior portion of the housing 1302. Any means of securing and/or removing the cover 1304 to/from the housing 1302 may be used.

FIG. 14 illustrates yet another exemplary dispenser 1400, according to some implementations of the current subject matter. The dispenser 1400 may be similar to the dispensers shown in FIG. 1A-13. The dispenser 1400 may include a housing 1402 and dispensing portion 1408, as discussed above. The housing 1402 may also include a button 1404. The button may be used to eject or partially remove (state 1403) and/or conceal (state 1401) the dispensing portion 1408 from and/or into the interior portion of the housing 1402. Once the button 1404 is pressed, the dispensing portion 1408 may slide inside the housing 1402; upon pressing the button 1404 the next time, the dispensing portion 1408 may slide out of the housing 1402. The button 1404 may be coupled to a mechanical, electrical, electronic, electro-mechanical and/or any combination thereof, mechanism that may trigger movement of the dispensing portion 1408.

Figure 15:
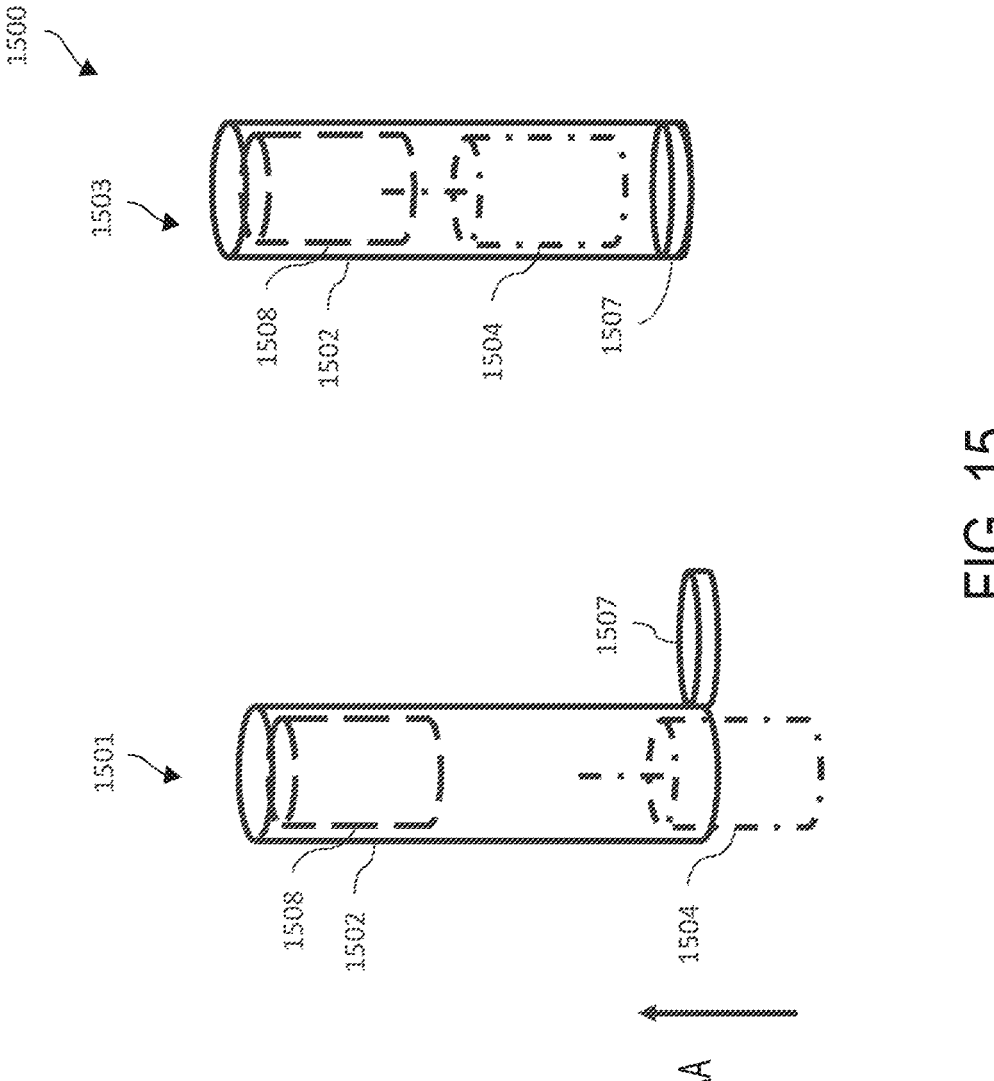

FIG. 15 illustrates an exemplary process for loading a dispenser 1500 (similar to dispensers shown in FIGS. 1A-14) with a dental floss 1504, according to some implementations of the current subject matter. As shown in FIG. 15, the dental floss 1504 may be loaded into the housing 1502 from the bottom of the housing 1502 on an opposite side to the dispensing portion 1508. In particular, to load the dental floss 1504, a bottom portion 1507 may be opened (state 1501) and the dental floss 1504 may be inserted in an upward direction (i.e., direction AA). Once the dental floss 1504 has been loaded into the housing 1502, the bottom portion 1507 may be closed (state 1503). As can be understood, the bottom portion 1507 may be hingedly coupled to the housing 1502, may be entirely removable from the housing 1502, may be snapped on/off the housing 1502, may be clipped on/off the housing 1502, and/or otherwise coupled to the housing in any desired way.

FIG. 16 illustrates an exemplary process for loading a dispenser 1600 (similar to dispensers shown in FIGS. 1A-14) with a dental floss 1604, according to some implementations of the current subject matter. The housing 1602 of the dispenser 1600 may include a dispensing portion 1608 and/or an access structure 1607. The structure 1607 may be a single or a double side door, a vertical clam-shell structure, a horizontal clam-shell structure, and/or any other structure that may allow positioning of the dental floss 1604 inside the interior portion 1602 of the dispenser 1600. As, for example, is shown in FIG. 16, the housing 1602 may include a vertical clam-shell structure 1607 that may be configured to allow opening (e.g., rotation in directions B and C) on of the housing 1602 to expose the interior portion of the housing 1602. Once the interior is exposed, the dental floss 1604 (shown outside dispenser in state 1601) may be placed inside the housing 1602 (e.g., as shown by direction AAA) and the clam-shell structure 1607 may be closed (state 1603), thereby concealing the interior portion of the housing 1602. As can be understood, the access structure 1607 may include at least one of the following: one or more hinges, one or more locks, one more hooks, one or more snaps, and/or any other mechanisms.

In some implementations, the housing of the dispenser (e.g., dispenser shown in FIGS. 1A-17E) may include storage space that may allow storage of various items, such as, but not limited to, toothpaste, toothpicks, floss picks, medication, toothbrush head(s), money, food, etc. The space may accessed using any of the means discussed above. In some exemplary implementations, the dispensing portion 108 (e.g., as shown in FIG. 1A) may be substituted for and/or replaced with a toothbrush and/or any other device. For example, the dispensing portion 108, 308 may be removed (e.g., by detaching, unscrewing, unclipping, unsnapping, etc.) and a toothbrush (and/or a toothbrush head, a toothbrush head with a handle, etc.) may be positioned instead of the dispensing portion, such as by attaching, screwing, clipping, snapping, etc. The toothbrush may be moved in and out of the housing of the dispenser in a similar fashion as the dispensing portion 108, 308. In some exemplary implementations, the toothbrush can be permanently positioned within the housing of the dispenser. In some exemplary implementations, the dispensing portion 108 may be substituted (either temporarily and/or permanently) with any other tools (dental or otherwise, e.g., floss picks (small or large), toothpicks, scissors, hair combs/brushes, filers, nail clippers, screwdrivers, pliers, etc.).

FIGS. 17A-E illustrates an exemplary dental floss supporting/stabilization structure 1702, according to some implementations of the current subject matter. In some exemplary implementations, the structure 1702 may be used for securing/stabilizing the wound string of dental floss 604 (e.g., a bobbin, a roll, etc.), as shown in FIG. 6. The structure 1702 may be configured to wrap the wound string of dental floss 604, thereby improving dispensing of the dental floss from the dental floss dispenser shown in FIGS. 1A-16, preventing tangling of dental floss string, etc.

Figure 17A:
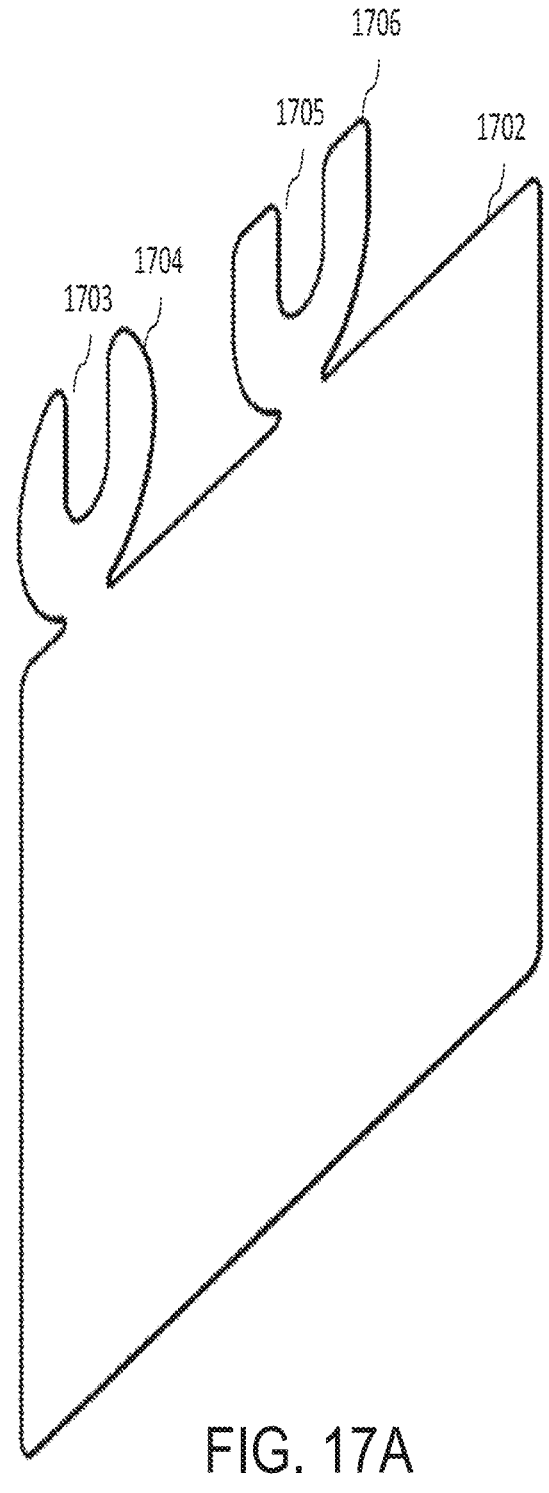
FIGS. 17A-E illustrate exemplary protection/stabilization structure for a dental floss, according to some implementations of the current subject matter.
Figure 17B:
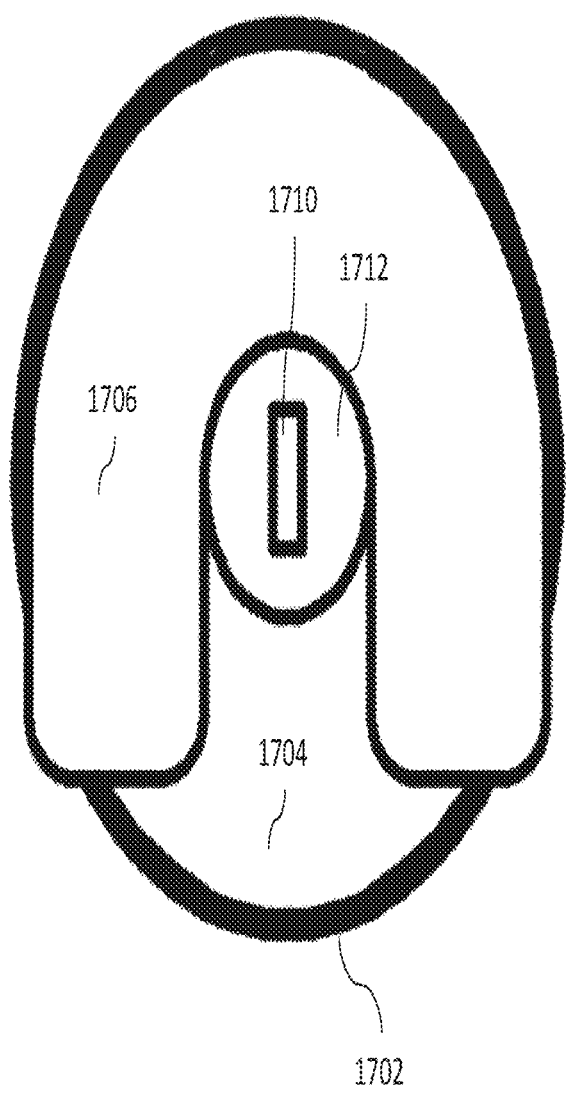
Figure 17C:
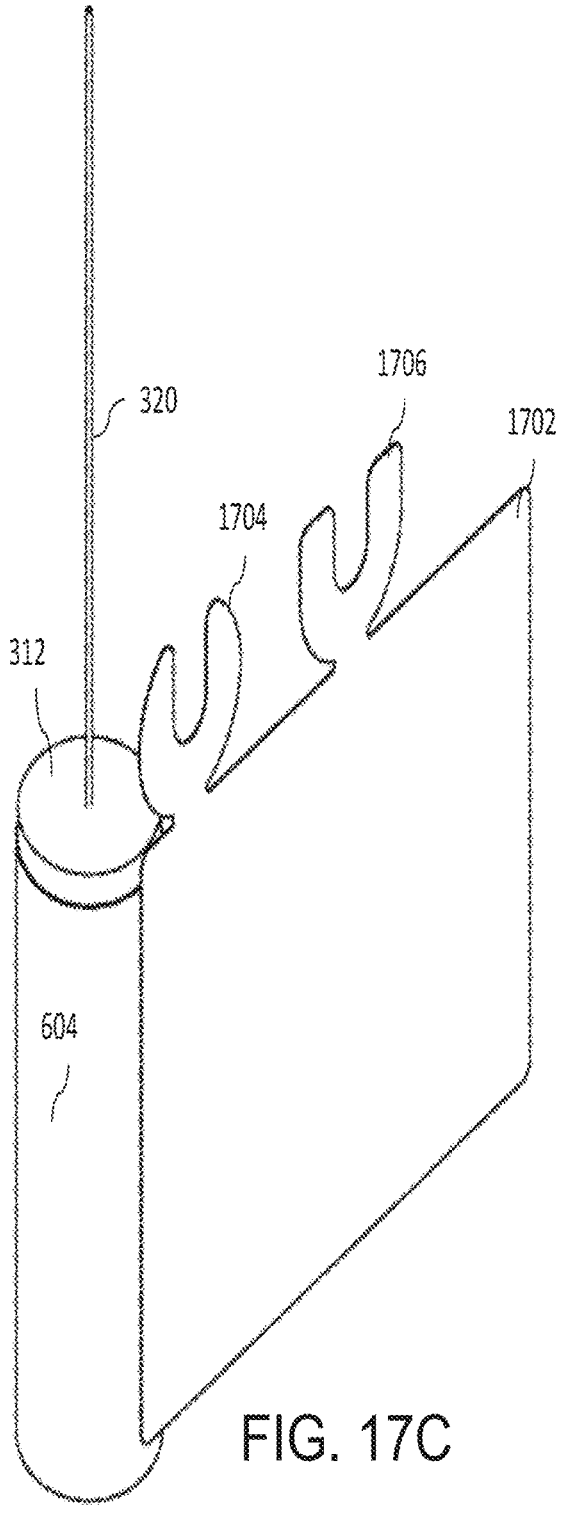
Figure 17D:
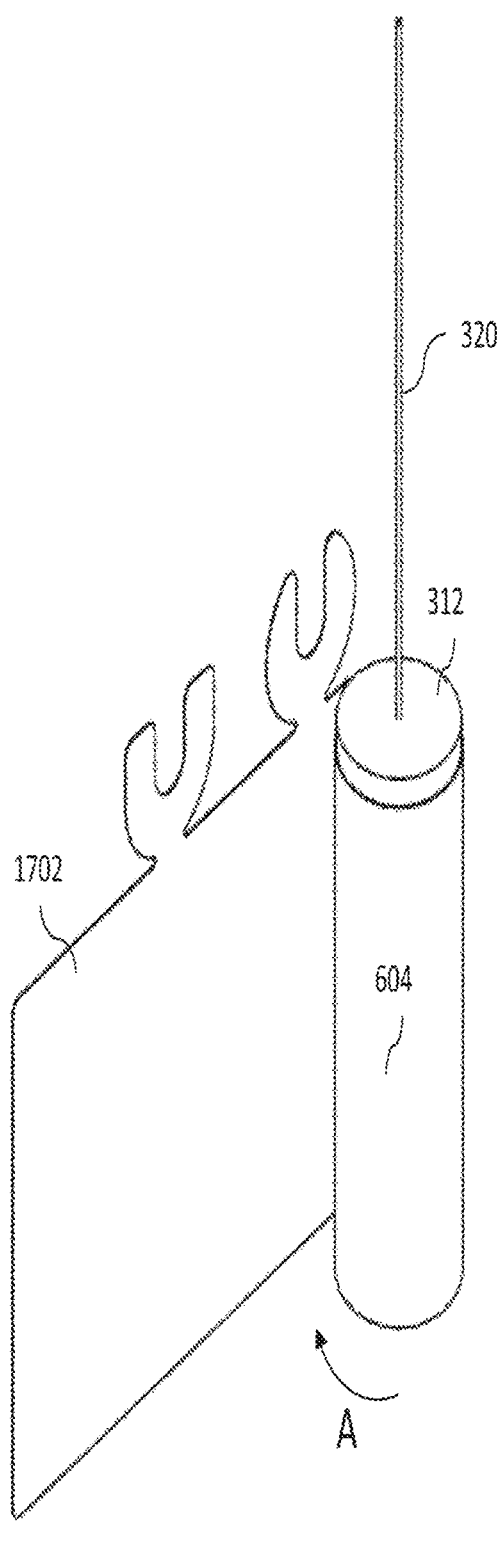
Figure 17E:
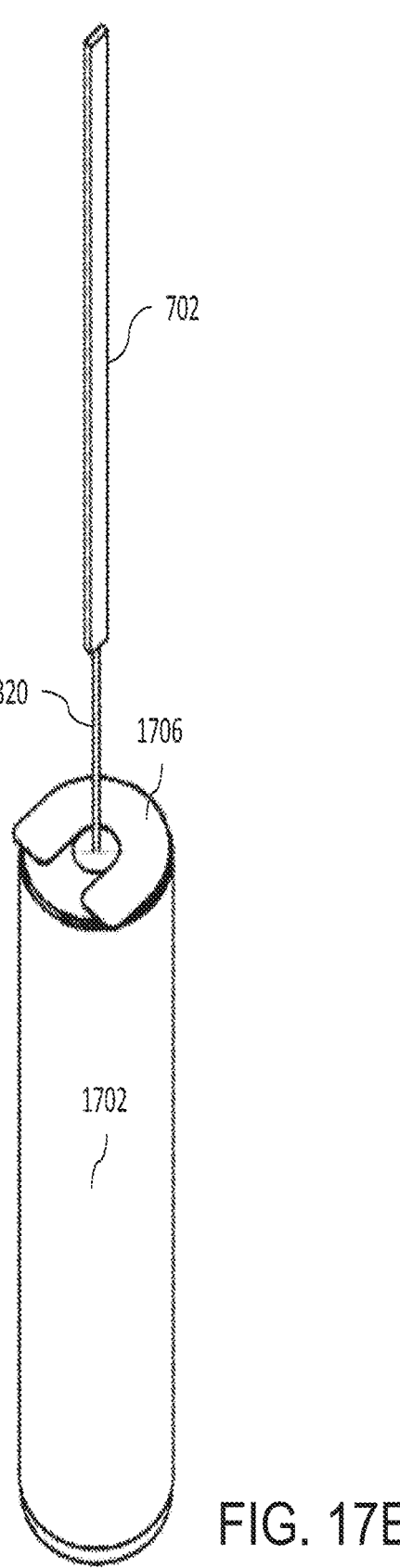

As shown in FIGS. 17A-E, to secure the wound string of dental floss 604, a cover 1712 (e.g., a rubber disk, a pill, etc.) and the support structure 1702 may be used. The cover 1712 may include a slit 1710 that may be used for threading a string 320 of the dental floss. The cover 1712 may be placed on top of the bobbin 604 (as shown in FIG. 17E). The bobbin may be configured to be coreless, e.g., there is no core (e.g., paper, plastic, etc.) structure in the center of the bobbin, whereby the dental floss may unwind from the center of the bobbin rather than from the outside. As can be understood, the floss may be configured to unwind from any location on the bobbin. In some exemplary, non-limiting implementations, the wound string of dental floss (or a refill of dental floss) may be configured as a cylindrical bobbin 604. As can be understood, the bobbin 604 may have various shapes, sizes, lengths of floss wrapped in, thickness of floss, etc.

The support structure 1702 may be configured as a wrap that may include an adhesive backing disposed on one side of the structure 1702. The adhesive may be safe for use with the dental floss, and thus, safe for use for the user. The support structure may be wrapped around the bobbin 604. The support structure may include tabs 1704 and 1706. The tabs 1704, 1706 may be configured to protrude away from an edge of the structure 1702, as shown in FIG. 17A. The tabs 1704, 1706 may be configured as two-prong structures having spaces 1703, 1705, respectively. The spaces 1703, 1705 may be used for positioning around the cover 1712, as shown in FIG. 17B. The prong structures 1704, 1706 may be shaped differently, as for example is shown in FIG. 17A, and may be configured to include an adhesive backing.

As shown in FIGS. 17C-E, the structure 1702 may be adhesively coupled to the bobbin 604, with the prongs 1704 and 1706 being aligned in the same direction as a string of floss. The floss may be threaded through the slit 1710 of the cover 1712. Once the structure 1702 is coupled to the bobbin 604, the bobbin 604 may be rotated in a direction A (as shown in FIG. 17D) to wrap the structure 1702 around the bobbin 604. Alternatively, or in addition to, the structure 1702 may be wrapped around the bobbin 604 without rotating the bobbin 604. Upon wrapping the structure 1702 around the bobbin 604, the tab 1704 may be lowered on top of the cover 312 (the tab 1704 may include an adhesive backing and thus, be adhesively coupled to the cover 312). The second tab 1706 may be placed on top of the first tab 1704, as shown in FIGS. 17B and 17E. In some exemplary implementations, the tab 1706 may be without any adhesive backing, which may assist the user of the dental floss dispenser in easily removing the spent dental floss refill by simply pulling on the tab 1706.

After the bobbin is wound, the dispensing end 702 of the dental floss 320 may be threaded through the slit 1712 in the cover 1710. The cover 1710 along with the slit 1712 may provide a friction drag onto the dental floss 320 as it is dispensed to prevent the dental floss 320 from dispensing unintentionally and may further provide tension on the dental floss 320 which may assist during the floss cutting process. After threading through the slit 1710, the bobbin 604 and cover 1712 may be wrapped together by rolling the adhesive structure 1702 around the bobbin and the cover. This may ensure that the surface of the bobbin 604 is adhered to the structure 1702. The adhesive structure 1702's tabs 1704, 1706 may be shaped and positioned to allow for the cover 1712 to be securely fastened to the bobbin 604 while allowing the dental floss 320 to pass freely through the slit 1710. After the bobbin 604 is assembled with the cover and the structure 1702, the dispensing end of the dental floss may be rigidized (e.g., using a wax coating 702) to allow the user to easily thread that end into the dispenser device. Further, in some implementations, the structure 1702 may provide a rigid structure for the outer windings of floss in the floss bobbin 604, where such windings may be configured to adhere to the structure 1702. Absent the structure 1702, the bobbin 604 may collapse inwards and/or may cause tangling and/or knotting of the dental floss. Moreover, the structure 1702 may allow the full length of the bobbin 604 to be dispensed without knotting and/or tangling.

To remove an expended refill from the dispenser device, the user may remove the cap portion of the dispenser device, grasp the loose tabs 1704 and/or 1706 from the refill, and pull the empty adhesive wrap out of the dispenser device to thereby remove the adhered cover simultaneously. To refill the device after removing an expended refill, the user may place the new bobbin 604 into the dispenser device with the dispensing end of the floss pointed upwards. The user may then thread the rigidized portion of dental floss through the cap of the dispenser device, replace the cap to the dispenser device, and press down firmly until the cap "clicks" into place.

As can be understood the shapes and/or sizes of any components of the dispenser are not limited to those shown in FIGS. 1A-17E. The dispenser and/or any of its components may have cylindrical shape(s), cubical shape(s), circular shape(s), square shape(s), rectangular shape(s), irregular shape(s), and/or any other shapes.

In some implementations, the current subject matter relates to a dental floss dispenser (e.g., dispenser 100, shown and described above in connection with FIGS. 1A-17E). The dental floss dispenser may include a dispenser housing 102 enclosing an interior portion and a dispensing portion 108 slidably positioned inside the interior portion of the dispenser housing. The dispensing portion 108 may have a stored position (e.g., as shown in FIGS. 1A-B) and a dispensing position (e.g., as shown in FIGS. 3A-C). In the stored position, the dispensing portion may be entirely disposed in the interior portion. In the dispensing position, the dispensing portion may be partially disposed outside of the interior portion. The dispensing portion may further include a storage chamber (e.g., floss housing 402) for storing a wound string of dental floss (e.g., dental floss 604) and a floss dispensing cavity (e.g., floss holding section 306) for holding at least a portion of the wound string of dental floss extracted from the storage chamber.

In some implementations, the current subject matter may include one or more of the following optional features. The dental floss dispenser may further include a locking mechanism (e.g., as shown in FIGS. 4 and 8) configured to temporarily retain the dispensing portion in the stored position or the dispensing position. The locking mechanism may include a spring component (e.g., spring 404) and a latching component (e.g., latch portions 414, 412, 408). The spring component, upon unlocking of the latching component, may be configured to position the dispensing portion in the dispensing position. The latching component, upon locking, may be configured to retain the dispensing portion in the stored position.

In some implementations, the dispensing portion may be configured to be entirely removable from the interior portion of the dispenser housing (e.g., as shown in FIGS. 4 and 6). The wound string of dental floss may be configured to be removable from the storage chamber upon entire removal of the dispensing portion from the interior portion of the dispenser housing. The wound string of dental floss may be configured to be wound in a coreless manner (e.g., without a core structure). In some implementations, a support structure (e.g., wrap 1702 shown in FIGS. 17A-E) may be configured to wrap the wound string of dental floss. The support structure may be configured to adhesively wrap the wound string of dental floss. The wound string of dental floss may be further configured to unwind from an interior of the wound string of dental floss. The wound string of dental floss may be configured to have one or more exterior dimensions smaller than one or more interior dimensions of the storage chamber. The wound string of dental floss may include a laminated end (e.g., end 702). The wound string of dental floss may be configured to be wound in at least one of the following shapes: a cylinder, a tube, a roll, a torus, a sphere, a cone, a prism, an ellipsoid, a helix, and any combination thereof.

In some implementations, the dispensing portion may include a concave open cavity (e.g., cavity 308) having a top 311 and a bottom 313, a first opening 304 disposed in the bottom and configured for protruding the portion of the wound string of dental floss from the storage chamber, and a second opening 315 disposed in the top and configured for holding the protruded portion of the wound string of dental floss. The second opening of the concave open cavity may include a cutting mechanism (e.g., cutting mechanism 502) for cutting the dental floss.

In some implementations, the dispenser housing may include a stopping mechanism (e.g., lip 418) disposed in the interior portion proximate to a top of the dispenser housing. The dispensing portion may include one or more protrusions (e.g., protrusions 416) disposed on an exterior surface of the dispensing portion. The stopping mechanism may be configured to interact with one or more protrusions to temporarily prevent removal of the dispensing portion from the interior portion of the dispenser housing.

In some implementations, the storage chamber may be configured to be interlocked with the floss dispensing cavity for holding the wound string of dental floss (e.g., as shown in FIG. 6).

In some implementations, the current subject matter relates to a method of loading the dental floss dispenser described above. FIG. 18 illustrates an exemplary method 1800 for loading the dental floss dispenser with a dental floss. At 1802, the dental floss dispenser, as described above, may be provided. At 1804, the dispensing portion may be removed from the interior portion of the dispenser housing. At 1806, the wound string of dental floss may be inserted into the storage chamber. At 1808, at least a portion of the wound string of dental floss may be extracted from the storage chamber and the extracted portion of the wound string of dental floss may be positioned across the floss dispensing cavity (e.g., as shown in FIG. 3C). At 1810, the dispensing portion may be placed into the interior portion of the dispenser housing.

Figure 19:
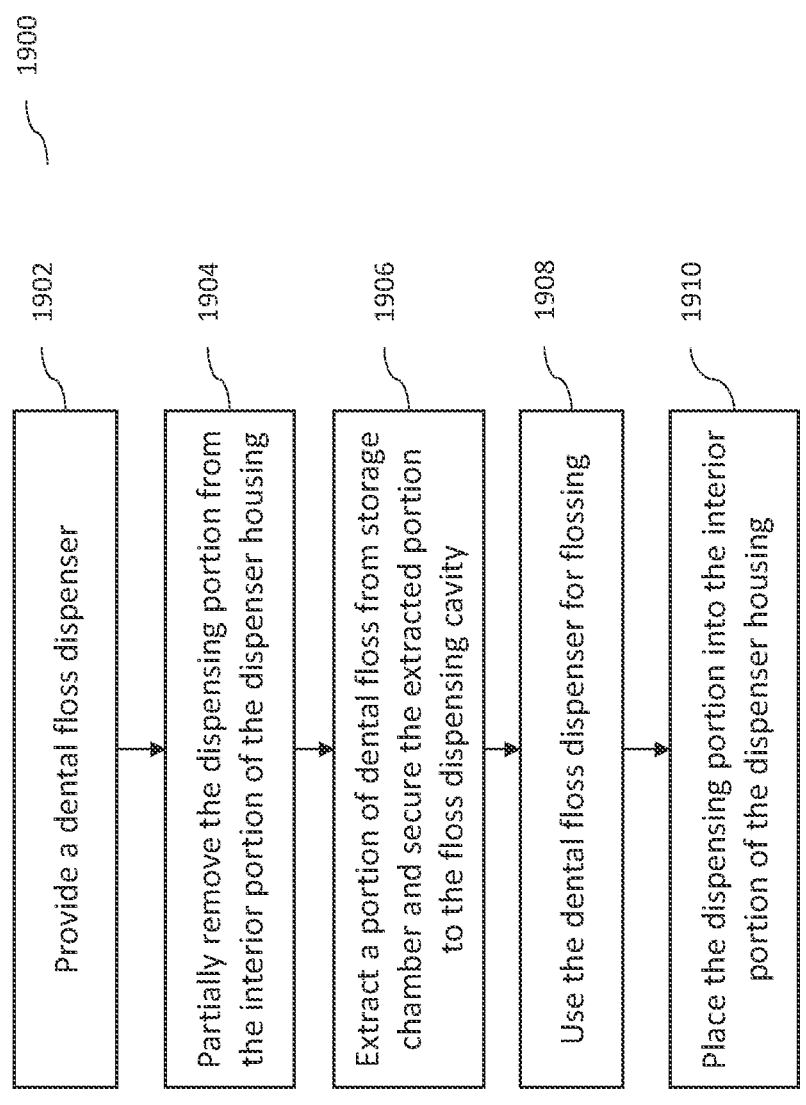
FIG. 19 illustrates an exemplary method for using a dental floss dispenser, according to some implementations of the current subject matter.

In some implementations, the current subject matter relates to a method of using the dental floss dispenser described above. FIG. 19 illustrates an exemplary method 1900 for using the dental floss dispenser described above. The method 1900 may include providing the dental floss dispenser, as described above, at 1902. At 1904, the dispensing portion may be partially removed from the interior portion of the dispenser housing. At 1906, at least a portion of dental floss may be extracted from the storage chamber and the extracted portion may be secured to the floss dispensing cavity. At 1908, the dental floss dispenser may be used for flossing. At 1910, the dispensing portion may be placed into the interior portion of the dispenser housing.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. It will also be understood that when an element is referred to as being "connected" or "coupled" to another element, it can be directly connected or coupled to the other element or intervening elements may be present.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results.

What is claimed:

1. A dental floss dispenser, comprising:
a dispenser housing enclosing an interior portion;
a dispensing portion slidably positioned inside the interior portion of the dispenser housing, the dispensing portion having a stored position and a dispensing position, wherein, in the stored position, the dispensing portion is entirely disposed in the interior portion, and, in the dispensing position, the dispensing portion is partially disposed outside of the interior portion;
the dispensing portion including a storage chamber for storing a wound string of dental floss, a cutting mechanism, and a floss dispensing cavity for holding at least a portion of the wound string of dental floss extracted from the storage chamber;
a top portion of the dispensing portion that is exposed when the dispensing portion is in the stored position and in the dispensing position;
wherein the cutting mechanism includes an opening that extends from the floss dispensing cavity through the entirety of the top portion of the dispensing portion; and
a locking mechanism configured to retain the dispensing portion in the stored position and the dispensing position, wherein the locking mechanism includes a spring component and a latching component, wherein the spring component of the locking mechanism is configured to pop-out the dispensing portion from the stored position to the dispensing position when the latching component is unlocked by pressing the dispensing portion towards the interior portion and subsequently releasing the dispensing portion.

2. The dental floss dispenser according to claim 1, wherein the latching component is configured to retain the dispensing portion in the stored position when locked by pressing the dispensing portion towards the interior portion until the dispensing portion is locked inside the interior portion.

3. The dental floss dispenser according to claim 1, wherein the dispensing portion is configured to be entirely removable from the interior portion of the dispenser housing.

4. The dental floss dispenser according to claim 3, wherein the wound string of dental floss is configured to be removable from the storage chamber upon entire removal of the dispensing portion from the interior portion of the dispenser housing.

5. The dental floss dispenser according to claim 4, wherein the wound string of dental floss is configured to be wound in a coreless manner.

6. The dental floss dispenser according to claim 5, further comprising a support structure configured to wrap the wound string of dental floss.

7. The dental floss dispenser according to claim 6, wherein the support structure is configured to adhesively wrap the wound string of dental floss.

8. The dental floss dispenser according to claim 5, wherein the wound string of dental floss is configured to unwind from an interior of the wound string of dental floss.

9. The dental floss dispenser according to claim 5, wherein the wound string of dental floss is configured to have one or more exterior dimensions smaller than one or more interior dimensions of the storage chamber.

10. The dental floss dispenser according to claim 5, wherein the wound string of dental floss includes a laminated end.

11. The dental floss dispenser according to claim 5, wherein the wound string of dental floss is configured to be wound in at least one of the following shapes: a cylinder, a tube, a roll, a torus, a sphere, a cone, a prism, an ellipsoid, a helix, and any combination thereof.

12. The dental floss dispenser according to claim 1, wherein the dispensing portion includes a concave open cavity having a top and a bottom;

a first opening disposed in the bottom and configured for protruding the portion of the wound string of dental floss from the storage chamber; and a second opening disposed in the top and configured for holding the protruded portion of the wound string of dental floss.

13. The dental floss dispenser according to claim 12, wherein the second opening of the concave open cavity includes the cutting mechanism.

14. The dental floss dispenser according to claim 1, wherein the dispenser housing includes a stopping mechanism disposed in the interior portion proximate to a top of the dispenser housing and the dispensing portion includes one or more protrusions disposed on an exterior surface of the dispensing portion, the stopping mechanism is configured to interact with the one or more protrusions to temporarily prevent removal of the dispensing portion from the interior portion of the dispenser housing.

15. The dental floss dispenser according to claim 1, wherein the storage chamber is configured to be interlocked with the floss dispensing cavity for holding the wound string of dental floss.

16. The dental floss dispenser of claim 1, wherein the dispensing portion further comprises:

a concave open cavity having first opening for protruding the portion of the wound string of dental floss from the storage chamber, and a second opening that extends from the concave open cavity and through the top portion of the dispensing portion.

17. The dental floss dispenser of claim 1, further comprising a top portion that is exposed when the dispensing portion is in the stored position and in the dispensing position, wherein the top portion is dimensioned to fully fit within the interior portion of the dispenser housing.

18. The dental floss dispenser according to claim 1, wherein the dispenser housing has an opening in communication with the interior portion, and wherein the spring component is configured to pop-out the dispensing portion from the stored position to the dispensing position by pressing the top surface of the dispensing portion towards the interior portion past the opening of the dispenser housing and subsequently releasing the dispensing portion to the dispensing position.

19. A method, comprising:

providing a dental floss dispenser comprising:

a dispenser housing enclosing an interior portion;

a dispensing portion slidably positioned inside the interior portion of the dispenser housing, the dispensing portion having a stored position and a dispensing position, wherein, in the stored position, the dispensing portion is entirely disposed in the interior portion, and, in the dispensing position, the dispensing portion is partially disposed outside of the interior portion; and a locking mechanism configured to retain the dispensing portion in the stored position and the dispensing position, wherein the locking mechanism includes an ejection spring and a latching component, wherein the ejection spring of the locking mechanism is configured to pop-out the dispensing portion from the stored position to the dispensing position when the latching component is unlocked by pressing the dispensing portion towards the interior portion and subsequently releasing the dispensing portion, the dispensing portion including a storage chamber for storing a wound string of dental floss, a cutting mechanism, and a floss dispensing cavity for holding at least a portion of the wound string of dental floss extracted from the storage chamber;

a top portion of the dispensing portion that is exposed when the dispensing portion is in the stored position and in the dispensing position, wherein the cutting mechanism includes an opening that extends from the floss dispensing cavity through the entirety of the top portion of the dispensing portion;

removing the dispensing portion from the interior portion of the dispenser housing;

inserting the wound string of dental floss into the storage chamber;

extracting at least a portion of the wound string of dental floss from the storage chamber and positioning the extracted portion of the wound string of dental floss across the floss dispensing cavity; and placing the dispensing portion into the interior portion of the dispenser housing.

20. A method, comprising:

providing a dental floss dispenser comprising:

a dispenser housing enclosing an interior portion;

a dispensing portion slidably positioned inside the interior portion of the dispenser housing, the dispensing portion having a stored position and a dispensing position, wherein, in the stored position, the dispensing portion is entirely disposed in the interior portion, and, in the dispensing position, the dispensing portion is partially disposed outside of the interior portion; and a locking mechanism configured to retain the dispensing portion in the stored position and the dispensing position, wherein the locking mechanism includes an ejection spring and a latching component, wherein the ejection spring of the locking mechanism is configured to pop-out the dispensing portion from the stored position to the dispensing position when the latching component is unlocked, the dispensing portion including a storage chamber for storing a wound string of dental floss, a cutting mechanism, and a floss dispensing cavity for holding at least a portion of the wound string of dental floss extracted from the storage chamber;

a top portion of the dispensing portion that is exposed when the dispensing portion is in the stored position and in the dispensing position, wherein the cutting mechanism includes an opening that extends from the floss dispensing cavity through the entirety of the top portion of the dispensing portion;

pressing the dispensing portion towards the interior portion and subsequently releasing the dispensing portion to unlock the latching component and move the dispensing portion to the dispensing position;

extracting at least a portion of dental floss from the storage chamber and securing the extracted portion to the floss dispensing cavity;

using the at least a portion of dental floss for flossing; and pressing the dispensing portion into the interior portion of the dispenser housing to engage the latching component so the dispensing portion is retained in the stored position.

* * * * *